US012064977B2

(12) United States Patent
Goto et al.

(10) Patent No.: US 12,064,977 B2
(45) Date of Patent: Aug. 20, 2024

(54) RECORDING APPARATUS AND RECORDING METHOD

(71) Applicant: CANON KABUSHIKI KAISHA, Tokyo (JP)

(72) Inventors: Fumitaka Goto, Tokyo (JP); Tomokazu Ishikawa, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 18/161,642

(22) Filed: Jan. 30, 2023

(65) Prior Publication Data

US 2023/0241902 A1 Aug. 3, 2023

(30) Foreign Application Priority Data

Feb. 3, 2022 (JP) ................................ 2022-015784

(51) Int. Cl.
*B41J 2/355* (2006.01)

(52) U.S. Cl.
CPC .................................... *B41J 2/355* (2013.01)

(58) Field of Classification Search
CPC ....... B41J 2/355; B41J 2/36; B41J 2/35; B41J 2/3551; B41J 2/3553; B41J 2/3555; B41J 2/3556; B41J 2/3558
See application file for complete search history.

(56) References Cited

U.S. PATENT DOCUMENTS 4,789,872 A * 12/1988 Hosoi ................ H04N 1/40031 347/175
2009/0309946 A1 12/2009 Saquib

FOREIGN PATENT DOCUMENTS

JP 2021041710 * 3/2021 .............. B41J 2/315
WO WO2021153682 * 8/2021 .............. B41J 2/355

* cited by examiner

*Primary Examiner* — Kristal Feggins
(74) *Attorney, Agent, or Firm* — Canon U.S.A., Inc. IP Division

(57) ABSTRACT

A recording apparatus includes a recording head including a plurality of heating elements, a sheet-like recording medium formed of a plurality of laminated color-developing layers for developing a plurality of colors. A first condition is satisfied when a subsequent pixel, located at the same position as a target pixel to be recorded following the target pixel, is a pixel for developing a color of a bottom color-developing layer of the recording medium. In a case where a value of the target pixel in the image data is a predetermined value and does not satisfy the first condition, the pulse control unit controls the pulse so that a thermal energy to be applied to the recording medium by the recording head in forming the target pixel is lower than if the first condition is satisfied.

18 Claims, 17 Drawing Sheets

RECORDING APPARATUS AND RECORDING METHOD

BACKGROUND

Field of the Disclosure

The present disclosure relates to a recording apparatus and a recording method.

Description of the Related Art

In conventional recording using a thermal print head, monochromatic printing using thermal paper and color printing using an ink ribbon have been widely used. In recent years, color recording using paper provided with color-developing layers for a plurality of colors has been proposed and widely used as a simplified method for printing photographs. The above-described color-developing layers for a plurality of colors require different heating temperatures and heating time durations for color development. The method records a color image by developing the color of a specific color-developing layer by utilizing the differences (United States Patent Application Publication No. US2009/0309946).

However, the above-described example of the conventional method may cause false color development. For example, in a case where the pixel immediately after a high-density target pixel is a pixel that does not develop the color of any color-developing layer, the heat applied to the target pixel may propagate to the immediately subsequent pixel to possibly cause false color development of the color-developing layer corresponding to the immediately subsequent pixel.

SUMMARY

According to an aspect of the present disclosure, a recording apparatus includes a recording head including a plurality of heating elements arranged in a predetermined direction, configured to heat, based on image data, a sheet-like recording medium formed of a plurality of laminated color-developing layers for developing a plurality of colors when heated, and develop a color of a specific color-developing layer among the plurality of color-developing layers to form an image on the recording medium, a first condition determination unit configured to determine whether a first condition that a subsequent pixel, located at a same position as a target pixel in the predetermined direction and to be recorded following the target pixel, is a pixel for developing a color of a bottom color-developing layer of the recording medium is satisfied, and a pulse control unit configured to control a pulse to be applied to the recording head in forming the target pixel, based on a determination result of the first condition determination unit, wherein, in a case where a value of the target pixel in the image data is a predetermined value and does not satisfy the first condition, the pulse control unit controls the pulse so that a thermal energy to be applied to the recording medium by the recording head in forming the target pixel is lower than a thermal energy to be applied in a case where the value of the target pixel in the image data is the predetermined value and the first condition is satisfied.

Further features of the present disclosure will become apparent from the following description of embodiments with reference to the attached drawings.

DESCRIPTION OF THE EMBODIMENTS

Figure 1:
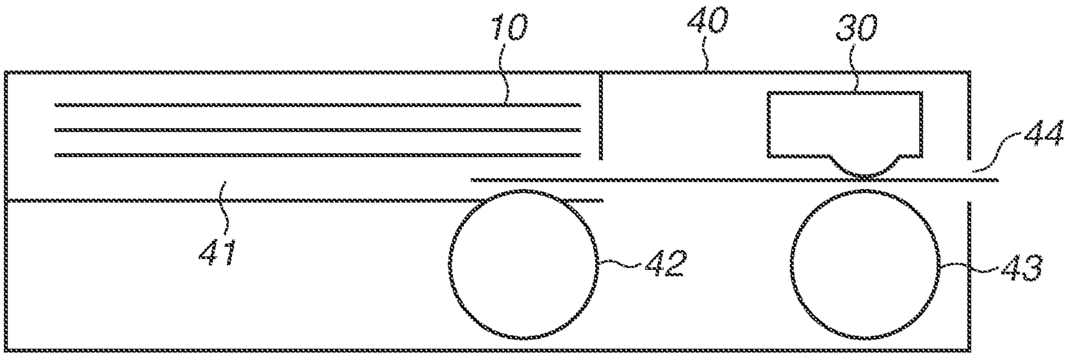
FIG. 1 illustrates an overall configuration of a recording apparatus according to a first embodiment.

Exemplary embodiments of the present disclosure will be more specifically described in more detail below with reference to the accompanying drawings. The following embodiments do not limit the present disclosure according to the scope of the appended claims. Although a plurality of features is described in the embodiments, not all of the plurality of features is indispensable to the present disclosure, and the plurality of features may be combined in an optional way. In the accompanying drawings, identical or similar components are assigned the same reference numerals, and duplicated descriptions thereof will be omitted.

Figure 2:
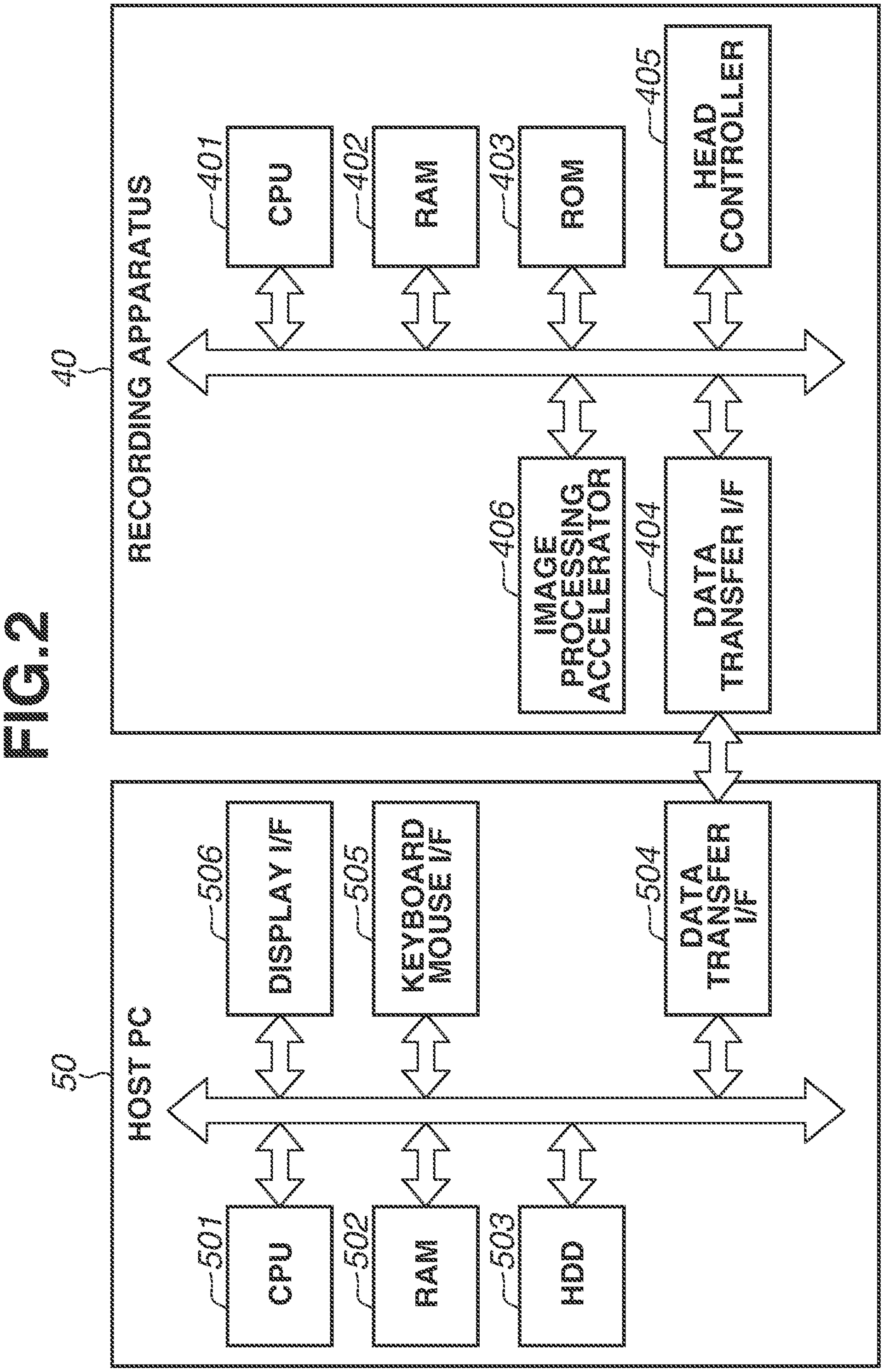
FIG. 2 illustrates a system configuration of the recording apparatus according to the first embodiment.
Figure 3:
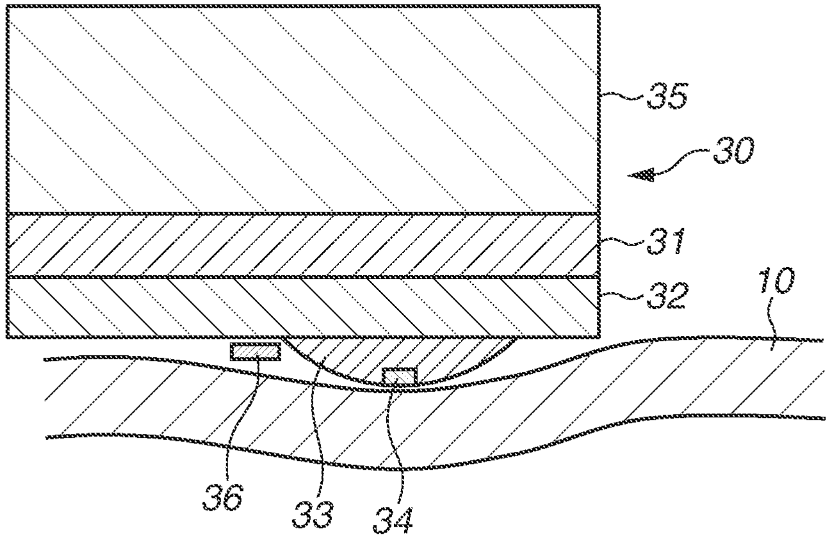
FIG. 3 illustrates configurations of a recording head and a recording medium at the time of recording according to the first embodiment.

Outline of Recording Apparatus (FIGS. 1 to 3)

FIG. 1 is a lateral cross-sectional view illustrating an overall configuration of a recording apparatus according to a first embodiment, which is a representative embodiment of the present disclosure.

As illustrated in FIG. 1, a recording apparatus 40 includes a recording head 30, a storage unit 41, a conveyance roller 42, a platen 43, and a discharge slot 44. The storage unit 41 can store a plurality of sheet-like recording media 10, and recording media 10 can be replenished by opening and closing a cover (not illustrated). At the time of printing, a recording medium 10 is conveyed to under the recording head 30 by the conveyance roller 42 and then subjected to image formation between the platen 43 and the recording head 30. When the recording medium 10 is discharged from the discharge slot 44, printing is completed.

FIG. 2 is a block diagram illustrating a control configuration of a recording system including the recording apparatus 40 illustrated in FIG. 1 and a host apparatus connected to the recording apparatus 40. As illustrated in FIG. 2, this recording system is constituted by the recording apparatus 40 illustrated in FIG. 1 and a host personal computer (host PC) 50 serving as a host apparatus of the recording apparatus 40.

The host PC 50 includes a central processing unit (CPU) 501, a random access memory (RAM) 502, a hard disk drive (HDD) 503, a data transfer interface (I/F) 504, a keyboard/mouse I/F 505, and a display I/F 506.

The CPU 501 performs processing according to a program stored in the HDD 503 or the RAM 502. The RAM 502 is a volatile storage and temporarily stores a program and data. The HDD 503 is a nonvolatile storage and stores programs and data similarly to the RAM 502. The data transfer I/F 504 controls data transmission and reception between the recording apparatus 40 and the host PC 50. Examples of usable data transmission and reception methods include wired connection methods such as Universal Serial Bus (USB), Institute of Electrical and Electronics Engineers (IEEE) 1394, and Local Area Network (LAN), and wireless connection methods such as Bluetooth® and WiFi. The keyboard/mouse I/F 505 is an interface for controlling user interfaces (UIs) such as a keyboard and a mouse and allows the user to input information to the host PC 50. The display I/F 506 controls display on a display (not illustrated).

The recording apparatus 40 includes a CPU 401, a RAM 402, a ROM 403, a data transfer I/F 404, a head controller 405, and an image processing accelerator 406.

The CPU 401 performs processing in each embodiment (described below) according to a program stored in the ROM 403 and the RAM 402. The RAM 402 is a volatile storage and temporarily stores a program and data. The ROM 403 is a nonvolatile storage and stores table data and programs used for processing in each embodiment (described below). The data transfer I/F 404 controls data transmission and reception between the recording apparatus 40 and the PC 50.

The head controller 405 controls a heating operation (described below) for the recording head 30 based on recorded data. More specifically, the head controller 405 is configured to read control parameters and recorded data from a predetermined address in the RAM 402. In other words, when the CPU 401 writes the control parameters and recorded data to a predetermined address in the RAM 402, the head controller 405 starts processing to perform the heating operation for the recording head 30.

The image processing accelerator 406 is configured by hardware and performs image processing faster than the CPU 401. More specifically, the image processing accelerator 406 reads parameters and data for image processing from a predetermined address in the RAM 402. When the CPU 401 writes the above-described parameters and data to a predetermined address in the RAM 402, the image processing accelerator 406 is activated to perform predetermined image processing.

The image processing accelerator 406 is not an essential component. Processing for creating the above-described table parameters and image processing may be performed only by the CPU 401 depending on the specification of the recording apparatus 40.

Configuration Outline of Recording Head (FIG. 3)

FIG. 3 is a sectional side view illustrating a configuration of the recording head 30 and a state of the contact portion where the recording head 30 is in contact with the recording medium 10.

The recording head 30 is provided with a glaze 32 on a substrate 31. The glaze 32 may be further provided with a "convex glaze" 33. In a case where there is the convex glaze 33, a resistor 34 is disposed on the surface of the convex glaze 33. On the other hand, in a case where there is no convex glaze 33, the resistor 34 is disposed on the surface of the flat glaze 32. It is desirable that a protection film layer is formed on the resistor 34, the glaze 32, and the convex glaze 33. Generally, a combination of the glaze 32 and the convex glaze 33 made of the same material is hereinafter referred to as "a recording head glaze". A thermistor 36 is disposed in the vicinity of the resistor 34 on the glaze 32.

The substrate 31 in contact with a heat sink 35 is cooled down by using a fan. The recording medium 10 generally comes into contact with the glaze 32 of the recording head 30 having a length substantially larger than the length of an actual heating resistor. The resistor 34 is an electrothermal conversion element (heater or heating element) that generates heat when supplied with an electric current. When the resistor 34 generates heat, the resistance value of the thermistor 36 disposed in the vicinity of the resistor 34 changes, which allows estimation of a temperature in the vicinity of the thermistor 36. However, the temperature of the resistor 34 corresponding to the surface temperature of the recording head 30 cannot be directly measured by the thermistor 36. Therefore, by associating the surface temperature of the recording head 30 with the corresponding temperature in the vicinity of the thermistor 36 experimentally, the surface temperature of the recording head 30 can be estimated. A typical resistor has a length of about 120 μm in the conveyance direction of the recording medium 10, although the thermal contact region on the recording medium 10 with the glaze of a common recording head has a length of 200 μm or more.

Figure 4:
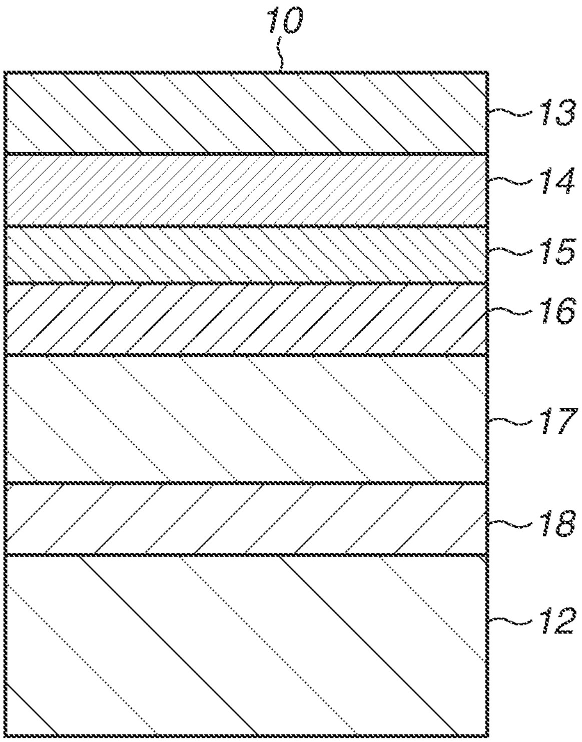
FIG. 4 illustrates a layer structure of the recording medium according to the first embodiment.
Figure 5:
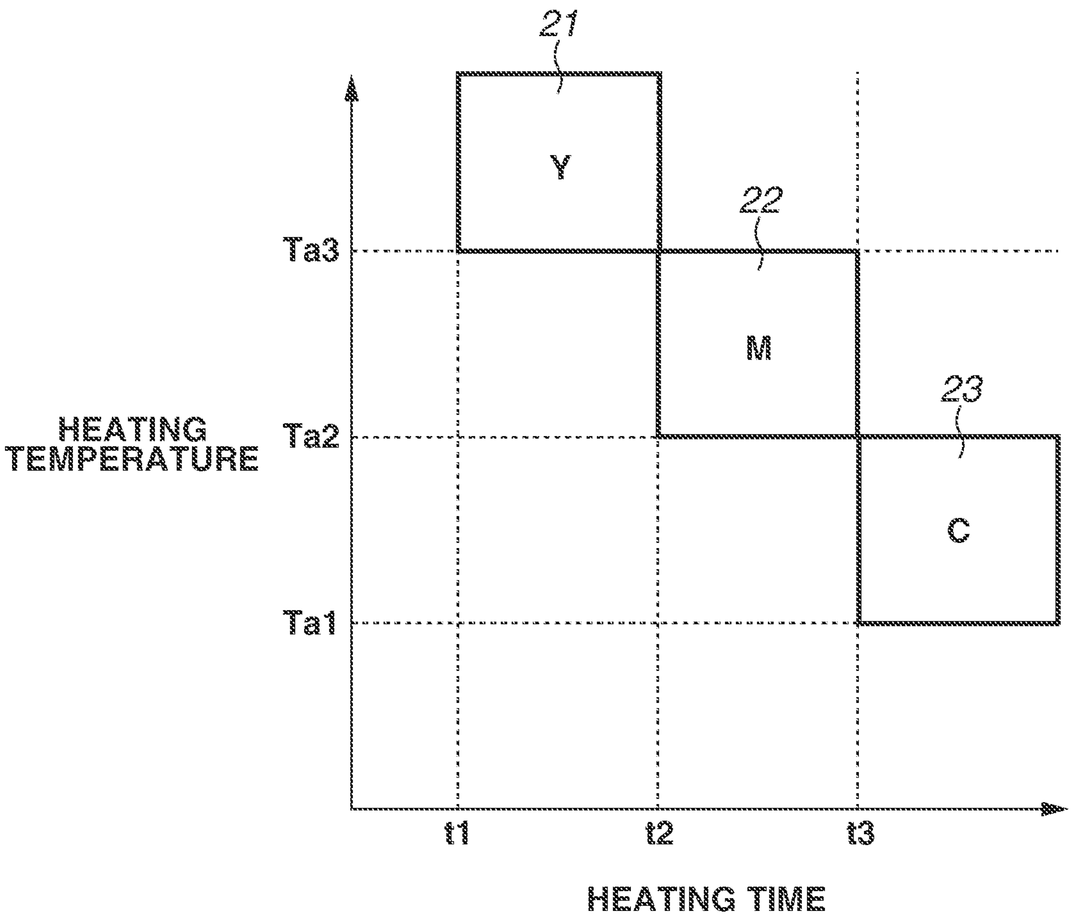
FIG. 5 illustrates a heating time and a heating temperature for color development of each image forming layer of the recording medium according to the first embodiment.

Outline of Recording Principle (FIGS. 4 and 5)

FIG. 4 is a cross-sectional view illustrating the structure of the sheet-like recording medium 10 to be used for image forming using infrared radiation as a heat source. The recording medium 10 is formed of a plurality of laminated color-developing layers corresponding to different colors. When a current is applied to the resistor 34, the color-developing layers are heated by a heat ray (infrared radiation) emitted from the resistor 34, and develop colors to form a full-color image. For this reason, the recording medium 10 is also called an infrared image material. In the following description, therefore, the recording medium 10 is also referred to as an infrared image material in such a meaning.

As illustrated in FIG. 4, the infrared image material 10 is formed of a base material 12 that reflects light, image forming layers 14, 16, and 18, spacer layers 15 and 17, and a protection film layer 13. The image forming layers 14, 16, and 18 generally develop yellow (Y), magenta (M) and cyan (C), respectively, at the time of full-color printing. However, a combination of other colors is also applicable.

Each of the image forming layers 14, 16, and 18 which are colorless in the initial state develops a color when heated up to a specific temperature called an activation temperature. The color order of the image forming layers 14, 16, and 18 can be any optional order. One of desirable color orders is the one described above. In another desirable color order, the three image forming layers 14, 16, and 18 are configured in order of cyan (C), magenta (M), and yellow (Y), respectively. An example where the image forming layers 14, 16, and 18 are configured in order of yellow (Y), magenta (M), and cyan (C), respectively, will be described below.

Although it is desirable that the spacer layer 15 is thinner than the spacer layer 17, the relation between the spacer layers 15 and 17 is not limited thereto if a material including both of the layers has substantially the same coefficient of thermal diffusivity. The function of the spacer layers 15 and 17 is to control the thermal diffusion within the infrared image material 10. In a case where the spacer layers 15 and 17 are made of the same material, it is desirable that the spacer layer 17 is at least four times thicker than the spacer layer 15. All of the layers disposed on the base material 12 are substantially transparent before image forming. If the color of the base material 12 is a light-reflecting color (e.g., white), a color image formed on the infrared image material 10 is visually recognized against a reflective background provided by the base material 12, through the protection film layer 13. Since the layers disposed on the base material 12 are transparent, a combination of colors formed in the image forming layers is visible.

The three image forming layers 14, 16, and 18 of the infrared image material 10 are disposed on the same side of the base material 12. However, some of the image forming layers 14, 16, and 18 may be disposed on the opposite side of the base material 12.

The image forming layers 14, 16, and 18 are processed at least partially independently depending on two different adjustable parameters, i.e., variations in temperature and time. These parameters are adjustable, and an image is formed on a desired image forming layer by selecting the temperature of the recording head 30 during heating of the infrared image material 10 and the time duration of heating.

In this case, the image forming layers 14, 16, and 18 are processed by being heated while the recording head 30 is in contact with the top layer of a material, i.e., the protection film layer 13 of the infrared image material 10. The activation temperature (Ta3) of the image forming layer 14 (the third image forming layer from the base material 12, closest to the surface of the infrared image material 10) is higher than the activation temperature (Ta2) of the image forming layer 16, and is also higher than the activation temperature (Ta1) of the image forming layer 18.

The heating of image forming layers farther away from the recording head 30 delays by the amount of time for heating required for the heat to diffuse to these layers through the spacer layers 15 and 17. Because of the foregoing delay in heating, an image forming layer closer to the recording head 30, of which the activation temperature is substantially higher, does not activate an image forming layer of which the activation temperature is lower (a layer farther away from the recording head 30). This enables heating the image forming layers to their activation temperature or higher. Therefore, when the top image forming layer 14 is processed, the recording head 30 is heated to a relatively high temperature in a short time. The heating is, however, insufficient to heat the image forming layers 16 and 18, and thus the image forming layers 16 and 18 are not activated.

To activate only an image forming layer close to the base material 12 (the image forming layer 16 or 18 in this case), the image forming layer is heated for a sufficiently long time duration at a temperature lower than the activation temperature of an image forming layer far away from the base material 12. As described above, when an image forming layer having a lower activation temperature is activated, an image forming layer having a higher activation temperature is not activated.

Although it is desirable that the infrared image material 10 is heated by using the recording head 30, a certain method for applying controlled heat to the infrared image material 10 is also applicable. For example, a known method means such as a modulated light source (e.g., a laser source) is also applicable.

FIG. 5 illustrates the heating temperature and the heating time duration of the recording head 30 necessary to process the image forming layers 14, 16, and 18 illustrated in FIG. 4.

In FIG. 5, the vertical axis indicates the heating temperature on the surface of the infrared image material 10 in contact with the recording head 30, and the horizontal axis indicates the heating time duration. A region 21 (a relatively high heating temperature and a relatively short heating time of the recording head 30) provides imaging of the image forming layer 14. A region 22 (an intermediate heating temperature and an intermediate heating time of the recording head 30) provides imaging of the image forming layer 16. A region 23 (a relatively low heating temperature and a relatively long heating time of the recording head 30) provides imaging of the image forming layer 18. The time duration required for imaging of the image forming layer 18 is substantially longer than the time duration required for imaging of the image forming layer 14.

Generally, the activation temperatures selected for the image forming layers 14, 16, and 18 are within a range from about 90° C. to about 300° C. It is desirable that the activation temperature (Ta1) of the image forming layer 18 is as consistently low as possible in terms of the thermostability of the infrared image material 10 during shipment and storage. The activation temperature (Ta1) is desirably about 100° C. or higher. It is desirable that the activation temperature (Ta3) of the image forming layer 14 is set to a temperature that does not activate the image forming layers 16 and 18 by the method according to the present method and is as consistently as high as possible in terms of the activation of the image forming layers 16 and 18 by heating through the image forming layer 14. The activation temperature (Ta3) is desirably about 200° C. or higher.

The activation temperature (Ta2) of the image forming layer 16 is higher than Ta1 and lower than Ta3 (Ta1<Ta2<Ta3). The activation temperature (Ta2) is desirably set in a range of about 140° C. to about 180° C.

The recording head 30 used here includes a row of a plurality of resistors linearly arranged to substantially extend over the total width of the image (in a direction perpendicular to the conveyance direction of the infrared image material 10).

The recording width of the recording head 30 may be shorter than the width of the image. In such a case, the recording head 30 is configured to move with respect to the infrared image material 10 or used together with other recording heads to process the total width of the image.

A heating pulse is provided to the recording head 30 by applying a current to these resistors. At the same time, imaging is performed while the infrared image material 10 is being conveyed in a direction perpendicular to the arrangement direction of the resistors of the recording head 30. Typically, the time duration during which the infrared image material 10 is heated by the recording head 30 is within a range from about 0.001 to about 100 milliseconds for each line of the image. The upper limit of the time duration is reasonably set in consideration of the balance with the image printing time while the lower limit is defined by the restrictions of an electronic circuit.

Generally, the interval between dots in image formation is within a range from 100 to 600 lines per inch in the conveyance direction of the infrared image material 10 and a direction perpendicular to the conveyance direction. The interval may be different in each direction.

The above-described recording apparatus is a type of thermal printer. The recording method employed by the recording apparatus is also called a Zero Ink (ZINK) method or Zero Ink Technology®.

Flowchart of Processing Performed by Recording System

Figure 6:
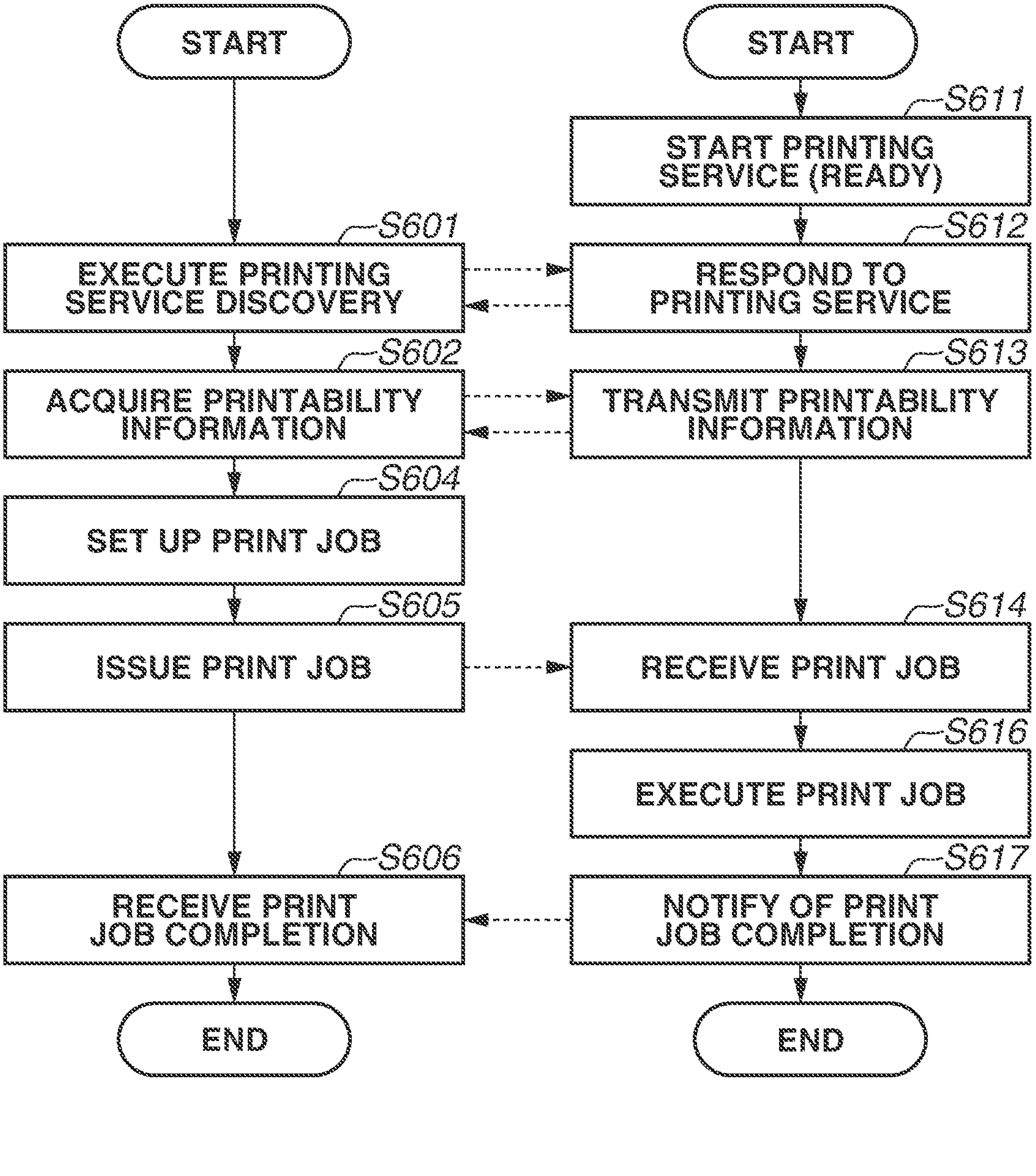
FIG. 6 is a flowchart illustrating processing performed by the recording apparatus and a host personal computer (PC) at the time of printing service execution according to the first embodiment.

FIG. 6 is a flowchart illustrating processing performed by the recording apparatus 40 and the host PC 50 when a conventional printing service is executed in the above-described recording system. In FIG. 6, steps S601, S602, and S604 to S606 indicate processing performed by the host PC 50, and steps S611 to S614, S616 and S617 indicate processing performed by the recording apparatus 40. As illustrated in FIG. 6, when the user wants to perform printing, the host PC 50 starts processing, and, in response to the start of processing by the host PC 50, the recording apparatus 40 starts processing. Thus, in step S611, the recording apparatus 40 confirms that the recording apparatus 40 itself is ready for printing, starts a printing service, and enters a printing preparation completion state (Ready).

In step S601, the host PC 50 performs printing service discovery in this state. In step S612, the recording apparatus 40 responds to the discovery and notifies that the recording apparatus 40 itself is a device capable of offering printing services. In step S602, the host PC 50 acquires printability information. Basically, the host PC 50 requests the recording apparatus 40 for the printability information. In step S613, the recording apparatus 40 notifies the host PC 50 of information about printing services that the recording apparatus 40 itself can offer.

In step S604, the host PC 50 constructs a user interface for generating a print job, based on the notified printability information. More specifically, based on the printability information about the recording apparatus 40, the host PC 50 displays print sizes, printable paper sizes, and other appropriate options on a display to provide them to the user. In step S605, the host PC 50 issues a print job.

In response, then in step S614, the recording apparatus 40 receives the print job. In step S616, the recording apparatus 40 executes the print job. Upon completion of printing based on the print job in the recording apparatus 40, then in step S617, the recording apparatus 40 notifies the host PC 50 of completion of the printing. In step S606, the host PC 50 receives the printing completion notification and notifies the user of completion of the printing.

Upon completion of the print job, the host PC 50 and the recording apparatus 40 complete the series of printing services.

In the above-described description, an example is given in which various information transmission is performed when the host PC 50 issues a request to the recording apparatus 40, and then the recording apparatus 40 responds to the request. However, communication between the host PC 50 and the recording apparatus 40 is not limited to a pull type communication, and may be a push type communication in which the recording apparatus 40 actively transmits information to the host PC 50 (and other host PCs) existing in a network.

Pulse Applied to Recording Head

Figure 7:
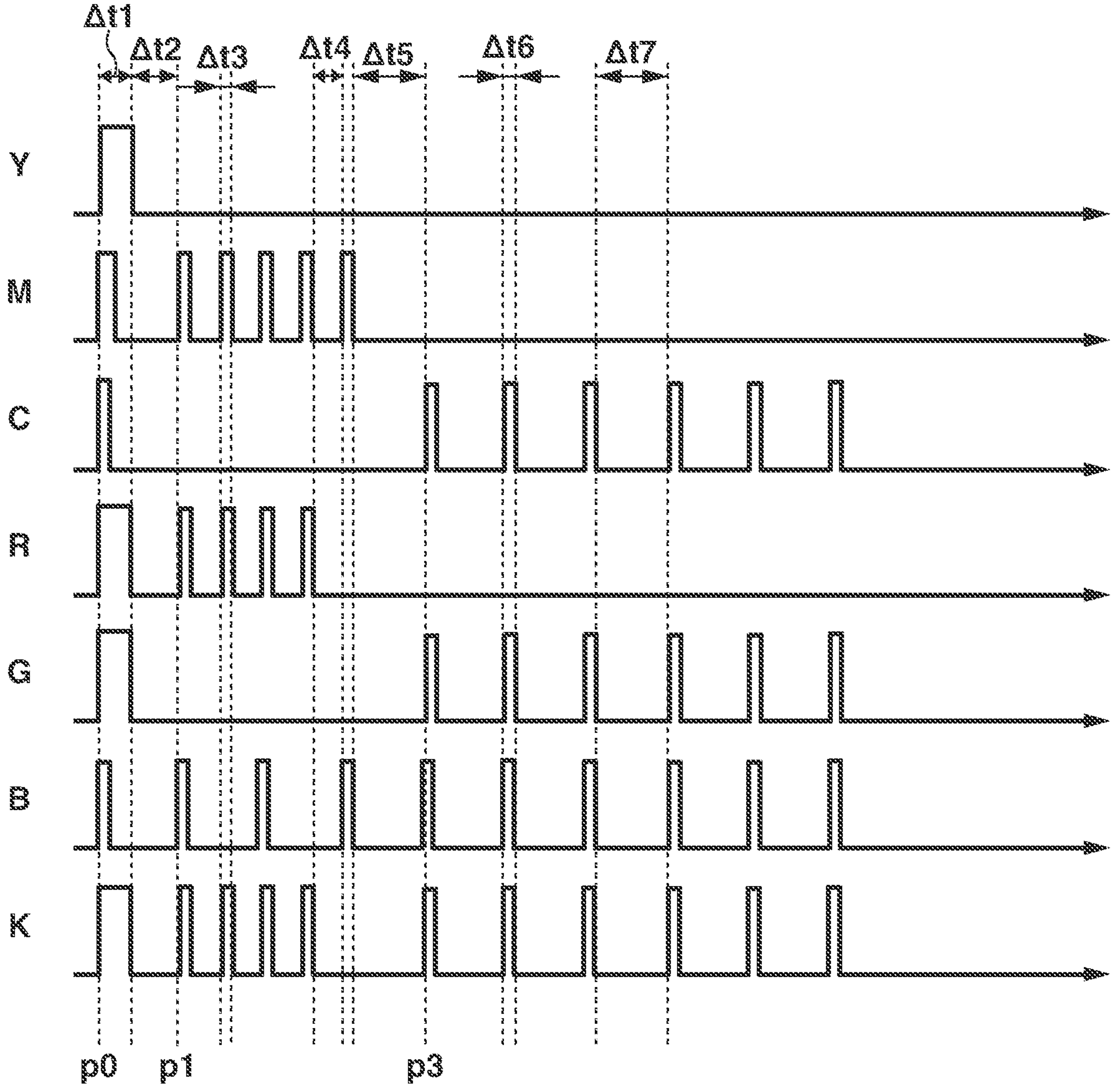
FIG. 7 illustrates pulses for developing respective colors according to the first embodiment.

FIG. 7 illustrates examples of heating pulses applied to the recording head 30 of the recording apparatus 40. In FIG. 7, the timing p0 indicates an earliest timing, and time elapses as the timing moves from left to right along the time axis.

In FIG. 7, colors to be developed are illustrated on the left-hand side, and heating pulses corresponding to the colors are illustrated to the right of the colors. For example, to develop yellow (Y), heating is performed at the timing p0 once for a time duration Δt1 in order to implement the heating temperature and the heating time of the region 21 in FIG. 5. To develop magenta (M), heating is first performed at the timing p0 once for a time duration shorter than the time duration Δt1 in order to implement the heating temperature and the heating time of the region 22 in FIG. 5. This heating is intended for preheating and does not develop the color. At the timing p1 after the lapse of Δt1+Δt2 from the timing p0, heating of a time duration Δt3 is performed a total of five times at intervals Δt4. To develop cyan (C), heating is first performed at the timing p0 once for a time duration shorter than the time duration Δt1 in order to implement the heating temperature and the heating time of the region 23 in FIG. 5. The heating time may be shorter than that for magenta (M). This heating is intended for preheating and does not develop the color. At the timing p3 after the lapse of Δt1+Δt2+((Δt3+Δ4)×Δ+Δt3)+Δt5 from the timing p0, heating of a time duration Δt6 is performed a total of six times at intervals Δt7. The heating time durations for Y, M and C are as follows.

Heating time duration for $Y=\Delta t1$

Heating time duration for $M=\Delta t3\times4+\Delta t3$

Heating time duration for $C=\Delta t6\times5+\Delta t6$

A relation between the heating time durations for the respective image forming layers is as follows.

Heating time duration for Y<Heating time duration for M<Heating time duration for C Herein, Y, M, and C refer to the image forming layers 14, 16, and 18, respectively.

The amount of heat applied by the recording head 30 is thermally conducted to the glaze 32, the substrate 31, and the heat sink 35 of the recording head 30 during the pulse intervals Δt2, Δt4, Δt5, and Δt7 when heating is not performed, and thus the temperature of the infrared image material 10 drops. Likewise, the amount of heat thermally conducted to the infrared image material 10 is also thermally conducted to the platen 43, and thus the temperature of the infrared image material 10 drops for the amount of heat thermally conducted to the platen 43. In a case where the amounts of heat applied are the same at the same temperature, the drop in the temperature is greater as the interval is longer. When only the image forming layers 14, 16, and 18 are heated by the heating time and the heating interval, the relations with peak temperatures in a case where only each of the colors of the image forming layers is to be developed based on the heating time duration and heating intervals are as follows.

Peak temperature for $Y>Ta3$ $Ta3>$Peak temperature for $M>Ta2$ $Ta2>$Peak temperature for $C>Ta1$ The above-described heating control enables each of the colors Y, M, and C to be developed independently.

Heating pulses for controlling color development of secondary colors (R, G, and B) and a tertiary color (K) will be described below.

The heating pulse for red (R) in FIG. 7 is controlled such that the colors of yellow (Y) and magenta (M) are developed in this order. The heating pulse for Green (G) in FIG. 7 is controlled such that the colors of yellow (Y) and cyan (C) are developed in this order. Likewise, the heating pulse for blue (B) in FIG. 7 is controlled such that the colors of magenta (M) and cyan (C) are developed in this order. Lastly, the heating pulse for black (K) in FIG. 7 is controlled such that the colors of yellow (Y), magenta (M), and cyan (C) are developed in this order.

To develop red (R), the heating time for color development of yellow (Y) is Δt1 which is the same as that for single color development of yellow (Y), while the number of pulses for color development of magenta (M) is four which is less than the number of pulses for single color development of magenta (M) by one. The reason for the less number of pulses is to prevent the image forming layer for cyan (C) from reaching the color developing temperature. To develop green (G), the heating pulses for single color development of yellow (Y) and single color development of cyan (C) are added. The temperature in the recording medium is caused to be decreased between the heating pulses for color development of yellow (Y) and color development of cyan (C) to prevent magenta (M) to be developed. To develop blue (B), at the timing p0, heating of the time duration Δt6 is performed a total of ten times at intervals Δt7. The number of heating pulses for color development of blue (B) is made larger than that for single color development of cyan (C) to allow the image forming layer for magenta (M) to reach the color developing temperature. To develop black (K), the heating pulse obtained by adding the heating pulse for color development of red (R) and the heating pulse for single color development cyan (C) is executed.

Figure 8:
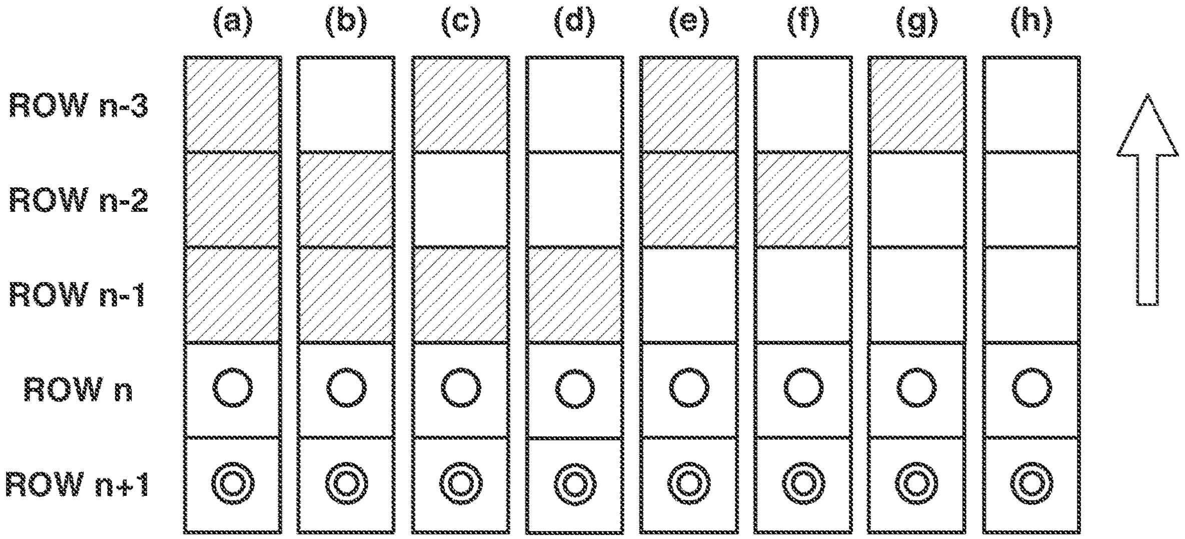
FIG. 8 illustrates reference pixels and image patterns according to the first embodiment.

FIG. 8 illustrates pixels to be referenced to control the heating pulses according to the present embodiment. The arrow in the FIG. 8 indicates the conveyance direction of the recording medium 10. Each of the patterns (a) to (h) in FIG. 8 illustrates a target pixel marked with a single circle, three preceding pixels immediately before the target pixel, and a pixel marked with a double circle immediately after the target pixel in the conveyance direction. The shaded pixels among the three preceding pixels indicate pixels that have developed black, i.e., a black color development pattern of the three pixels. Each of the pixels on the pointing end side of the arrow (pixels on the upper side of the drawing) is a pixel to be recorded first. In the pattern (a) in FIG. 8, since all of the three pixels have developed color, the temperatures of the recording medium 10 and the recording head 30 immediately before starting the recording of the target pixel are the highest among the patterns (a) to (h) in FIG. 8. In the pattern (h) in FIG. 8, since none of the three pixels has developed color, the temperatures of the recording medium 10 and the recording head 30 immediately before starting the recording of the target pixel are the lowest among the patterns (a) to (h) in FIG. 8. The closer the pixel for development of black is to the target pixel, the higher the temperatures of the recording head 30 and the recording medium 10 immediately before starting the recording of the target pixel. Therefore, the temperatures of the recording head 30 and the recording medium 10 immediately before starting the recording of the target pixel are higher in order of the patterns (a) to (h) in FIG. 8. The surface temperature of the recording head 30 resulted from the heating pulse applied to the preceding pixel before the target pixel is referred to as a thermal history. As another form, the temperature of each layer of the recording medium 10 may be used as the thermal history, or both of the surface temperature of the recording head 30 and the temperature of each layer of the recording medium 10 may be used as the thermal history. Although, in the following description, an example is given in which the three preceding pixels immediately before the target pixel are referenced, the number of pixels to be referenced is not limited thereto. The surface temperature of the recording head 30 immediately before starting the recording of the target pixel can be estimated by referring to at least one preceding pixel before the target pixel. However, since the temperature fluctuates depending on the thermal history of a plurality of preceding pixels before the target pixel, it is desirable to refer to a plurality of pixels before the target pixel from the viewpoint of the accuracy of temperature estimation. In addition, if too many pixels are referenced, the processing load increases. Thus, it is desirable that a suitable number of reference pixels is preset by executing experiment. The surface temperatures of the recording head 30 for the patterns (a) to (h) in FIG. 8 are measured by experiment in advance, and the relation between each pattern and the temperature of the recording head 30 is stored in the ROM 403 of the recording apparatus 40. This preparation enables estimation of the surface temperature of the recording head 30 based on the patterns (a) to (h) in FIG. 8. The temperatures of the image forming layers 14, 16, and 18 of the recording medium 10 may be used as thermal histories. As in the case of the recording head 30, the patterns (a) to (h) in FIG. 8 are associated with the temperatures of the image forming layers 14, 16, and 18 by experiment in advance. Sine color development occurs when each image forming layer eventually reaches a color-developing temperature, the use of the thermal history for each layer improves the control accuracy although the control becomes more complex. Since the temperature of each image forming layer changes depending on the surface temperature of the recording head 30 even with the same pulse, the use of the temperatures of both the recording head 30 and the recording medium 10 further improves the control accuracy.

The temperatures of the recording head 30 and the recording medium 10 may be actually measured at the time of image recording as described above, or may be simulated values. In a case of using simulated values, the specific heat, density, and heat conductivity of each of the materials of the recording head 30 and the recording medium 10, and the heating, pulse data, and sizes of the heaters in the recording head 30 are prepared as parameters. The above-described simulated values of the temperatures can be obtained by applying the prepared parameters to a heat conduction equation and solving the heat conduction equation in terms of the elapsed time and the conveyance direction. The temperatures need not be simulated, and any of the patterns (a) to (h) in FIG. 8 may be determined for each of the pixel values set as determination targets. Thus, the pixel value patterns may be used as thermal histories.

Figure 9:
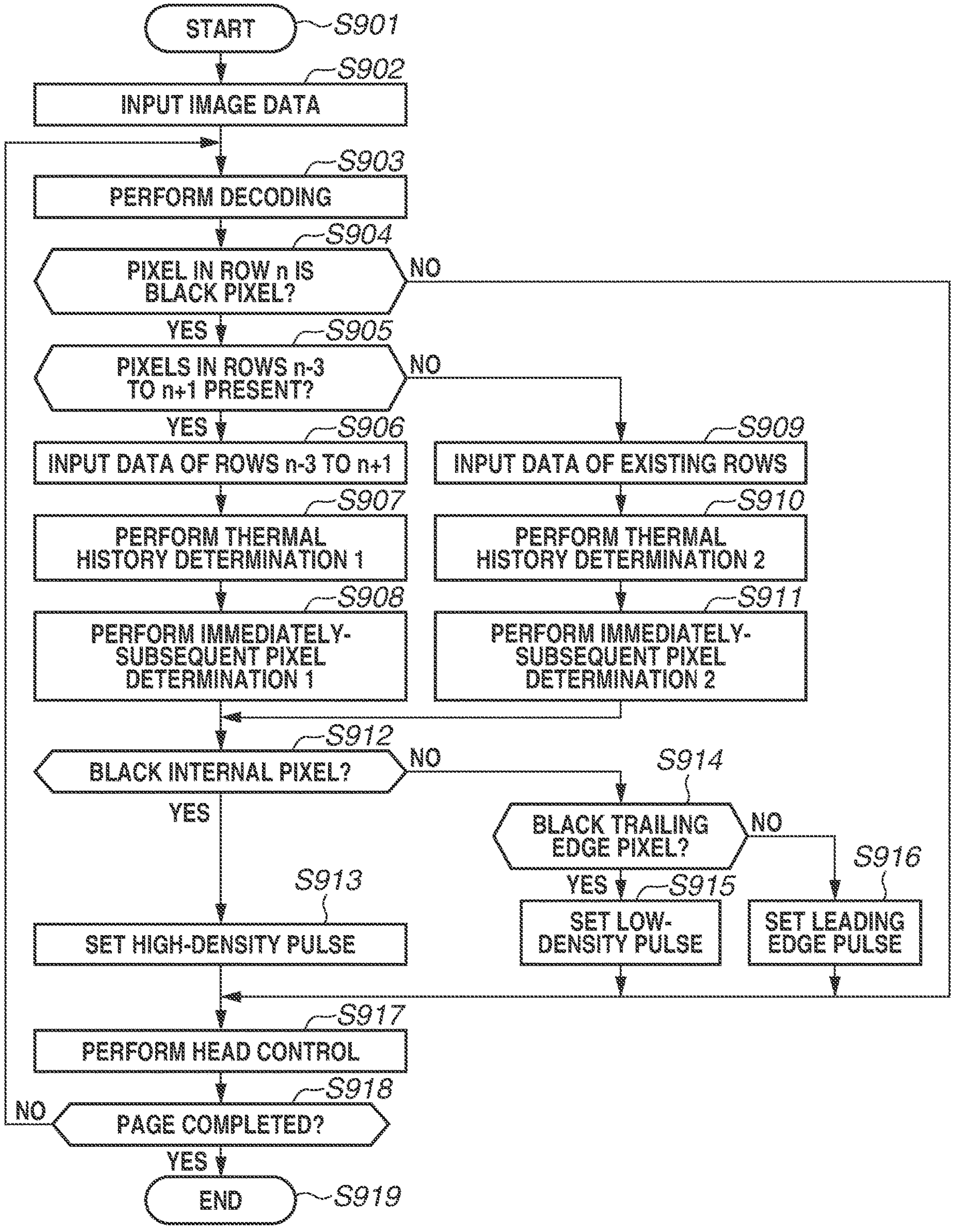
FIG. 9 is a flowchart illustrating a print job execution processing according to the first embodiment.

FIG. 9 is a flowchart illustrating the processing for executing a print job in step S616 in FIG. 6. In this processing, heating pulses are generated with reference to the pixels illustrated in FIG. 8, and printing is performed based on the generated pulses. The processing in the flowchart of FIG. 9 will be described below in step order. The processing in FIG. 9 is executed by the CPU 401 in accordance with a program stored in the ROM 403.

In step S901, the CPU 401 starts printing processing in the print job execution in step S616 in FIG. 6.

In step S902, the CPU 401 inputs image data for the print job received in step S614 in FIG. 6.

In step S903, the CPU 401 performs decoding processing when the image data is compressed or encoded.

In step S904, the CPU 401 determines whether the pixel in the row n which is the target pixel in the image data is a black pixel. The CPU 401 can determine whether the pixel is a black pixel that develops a black color, based on the RGB values of the input pixel data. By setting ranges of the RGB values in advance, the CPU 401 can determine whether the pixel is a black pixel based on the predetermined value ranges. For example, the RGB values of R=0 to r0, G=0 to g0, and B=0 to b0 are set as the ranges, and if the pixel has values in the ranges, the pixel is defined as a black pixel. The values of r0, g0, and b0 may be set in accordance with the desired value range to define a black pixel. When r0=0, g0=0, and b0=0, pixel data having the RGB values of R=0, G=0, and B=0 is determined to be a black pixel, and pixel data having other RGB values is determined to be not a black pixel. It is desirable that the values of r0, g0, and b0 are set to those that are highly likely to cause false color development in the immediately subsequent pixel in the row n+1 immediately after the heat propagation. Although, in the present embodiment, a pixel to be subjected to black color development is determined to be a pixel that is highly likely to cause false color development, the color needs not be black, and a pixel to be subjected to high-density color development of cyan (C) in the bottom layer may be determined to be a pixel that is highly likely to cause false color development.

In a case where the pixel in the row n is not determined to be a black pixel (NO in step S904), the immediately subsequent pixel in the row n+1 does not cause false color development due to the heat propagation, and the processing proceeds to step S917. In step S917, the CPU 401 performs control of the recording head 30 (head control) to perform image recording. At this timing, recording in the row n is performed using the pulses in FIG. 7. In a case where the pixel in the row n is determined to be a black pixel (YES in step S904), the immediately subsequent pixel in the row n+1 may possibly cause false color development due to the heat propagation, and thus the processing proceeds to step S905.

In step S905, when the pixel in the row n marked with a single circle in FIG. 8 in the image data is determined to be the target pixel, the CPU 401 determines whether the pixels in the rows n−3 to n+1 in FIG. 8 exist as a data region. The pixel in the row n is the target pixel, the pixels in the rows n−3 to n−1 are three preceding pixels, and the pixel in the row n+1 is one immediately subsequent pixel. In a case where the CPU 401 determines that the pixels in the rows n−3 to n+1 exist (YES in step S905), the processing proceeds to step S906. On the other hand, in a case where the CPU 401 determines that the pixels in the rows n−3 to n+1 do not exist (NO in step S905), the processing proceeds to step S909.

In step S906, the CPU 401 inputs the 8-bit RGB values (0 to 255) as pixel data in the rows n−3 to n+1 to be processed in step S907 and subsequent steps.

In step S907, the CPU 401 performs thermal history determination 1. In thermal history determination 1, the CPU 401 determines, using the black color development patterns (a) to (h) in FIG. 8, a black color development pattern of the three pixels in the rows n−3 to n−1 which are immediately before the target pixel upstream in the conveyance direction and are marked with a single circle in FIG. 8. The CPU 401 can determine whether a pixel is a black pixel based on the RGB values of the input pixel data. By setting ranges of the RGB values in advance, the CPU 401 can determine whether the pixel is a black pixel based on the predetermined value ranges. For example, the RGB values of R=0 to r0, G=0 to g0, and B=0 to b0 are set as the ranges, and if the pixel has values in the ranges, the pixel is defined as a black pixel. The values of r0, g0, and b0 may be set in accordance with the desired value range to define a black pixel. When r0=0, g0=0, and b0=0, pixel data having the RGB values of R=0, G=0, and B=0 is determined to be black (shaded pixels in FIG. 8), and pixel data having other RGB values is determined to be not black (white pixels in FIG. 8). The CPU 401 determines the pattern of the three preceding pixels to be any one of the patterns (a) to (h) in FIG. 8.

In step S908, the CPU 401 performs immediately subsequent pixel determination 1. In immediately subsequent pixel determination 1, the CPU 401 determines whether the pixel marked with a double circle in FIG. 8 as the pixel immediately after the target pixel marked with a single circle in FIG. 8 downstream in the conveyance direction satisfies a condition that the bottom image forming layer 18 of the recording medium 10 is to be subjected to color development. According to the present embodiment, since the image forming layer 18 of the recording medium 10 is subjected to color development of cyan (C), the image forming layer 18 is to be subjected to color development in the case of at least single color development of cyan (C), color development of green (G), color development of blue (B), and color development of black (K). The CPU 401 can determine whether the image forming layer 18 is to be subjected to color development by determining whether all of R=r1 to r2, G=g1 to g2, and B=b1 to b2 are satisfied. The values of r1, g1, b1, r2, g2, and b2 need to be suitably set so that at least the image forming layer 18 is to be subjected to color development. Assume an example case where r1=0, g1=0, b1=0, r2=0, g2=0, and b2=0. For example, when the immediately subsequent pixel marked with a double circle in FIG. 8 has the RGB values R=0, G=0, and B=0, the immediately subsequent pixel is to be subjected to black color development, and therefore the image forming layer 18 is determined to be subjected to color development. The reason why the image forming layer 18 is focused here will be described below. Referring to FIG. 5, the image forming layers 14 and 16 corresponding to yellow (Y) and magenta (M), respectively, of which the heating temperature is higher than the heating temperature that causes color development of cyan (C) and the heating time is shorter than the heating time for color development of cyan (C). This is because the temperature of a layer closer to the surface of the recording medium 10 can be raised in a shorter time, and the temperature of the recording medium 10 can be lowered in a shorter time. Therefore, if the heating pulses for color development of the image forming layers 14 and 16 are set to zero in the target pixel marked with a single circle or if no color development pulse is applied to these layers, the temperatures of these layers drop below the respective color developing temperatures. As a result, the temperatures of the image forming layers 14 and 16 of the immediately subsequent pixel marked with a double circle in FIG. 8 exceed the color developing temperatures of these layers due to the heat propagation of the heating pulse applied to the target pixel marked with a single circle in FIG. 8, making false color development hard to occur. On the other hand, since the image forming layer 18 is deep from the surface of the recording medium 10, it takes time until the temperature of the image forming layer 18 rises or falls. Even if the heating pulse that has developed the color of the image forming layer 18 is further set to zero in the target pixel, i.e., even if none of the color development layers are applied with a color development pulse, it takes time until the temperature of the image forming layer 18 falls below the color developing temperature. As a result, there may be a case where the temperature of the image forming layer 18 of the immediately subsequent pixel reaches or exceeds the color developing temperature due to the heat propagation of the heating pulse for the target pixel and the immediately subsequent pixel develops color although the cyan (C) color development pulse is not applied to the immediately subsequent pixel. For this reason, in the present embodiment, whether the bottom layer of the recording medium 10 is to be subjected to color development is focused in heating pulse control. In the present embodiment, input data that causes false color development in the immediately subsequent pixel, which is to be a white pixel, due to the heat propagation of the heating pulse for the pixel at the trailing edge of a solid image with a 100% image density is set as the target data to be controlled. Therefore, the values of the above-described r0, g0, and b0 need to be set to include this input data.

In step S909, the CPU 401 inputs the 8-bit RGB values (0 to 255) as pixel data in existing rows out of the pixels in the rows n−3 to n+1 in FIG. 8 to be processed in step S910 and subsequent steps.

In step S910, the CPU 401 performs thermal history determination 2. The thermal history determination 1, the CPU 401 determines which, using the black color development patterns (a) to (h) in FIG. 8, a black color development pattern of the three pixels in the rows n−3 to n−1 immediately before the target pixel marked with a single circle in FIG. 8 upstream in the conveyance direction. Like step S907, the CPU 401 can determine whether a pixel is a black pixel based on the RGB values of the input pixel data. Like step S907, when all of the rows n−3 to n−1 are input, the CPU 401 determines the three preceding pixels to be any one of the patterns (a) to (h) in FIG. 8. When only the rows n−2 to n−1 are input, the CPU 401 determines a pattern by referring to the rows n−2 and n−1 of the patterns (b), (d), (f), and (h) in in FIG. 8. When only the row n−1 is input, the CPU 401 determines a pattern by referring to the row n−1 of the patterns (d) and (h) in FIG. 8. When not even the row n−1 is input, the CPU 401 determines the preceding pixels to be the pattern (h) in FIG. 8.

In step S911, the CPU 401 performs immediately subsequent pixel determination 2. In immediately subsequent pixel determination 2, when the row n+1 is input, like step S908, the CPU 401 determines whether the pixel marked with a double circle in FIG. 8 as the pixel immediately after the target pixel marked with a single circle in FIG. 8 in the conveyance direction satisfies a condition that the bottom image forming layer 18 of the recording medium 10 is to be subjected to color development. When the row n+1 is not input, the CPU 401 determines that the image forming layer 18 of the immediately subsequent pixel not to be subjected to color development.

In step S912, the CPU 401 determines whether the target pixel marked with a single circle in FIG. 8 is possibly a black internal pixel. In a case where the CPU 401 determines the preceding pixels to match any one of the patterns (a) to (d) in FIG. 8 having a thermal history equal to or larger than a predetermined value in step S907, and determines that the bottom image forming layer 18 is to be subjected to color development in step S908 (YES in step S912), the processing proceeds to step S913. On the other hand, when the CPU 401 determines that the thermal history is less than the predetermined value (NO in step S912), the processing proceeds to step S914. An example of finely controlling the heating pulses for each of the patterns (a) to (h) in FIG. 8 will be described below.

In step S913, the CPU 401 sets a high-density pulse to the target pixel marked with a single circle in FIG. 8. The high-density pulse can be set using a three-dimensional look-up table (3D_LUT) as follows:

$$\text{High-density pulse}=\text{3D\_LUT}[R][G][B][0].$$

Figure 10:
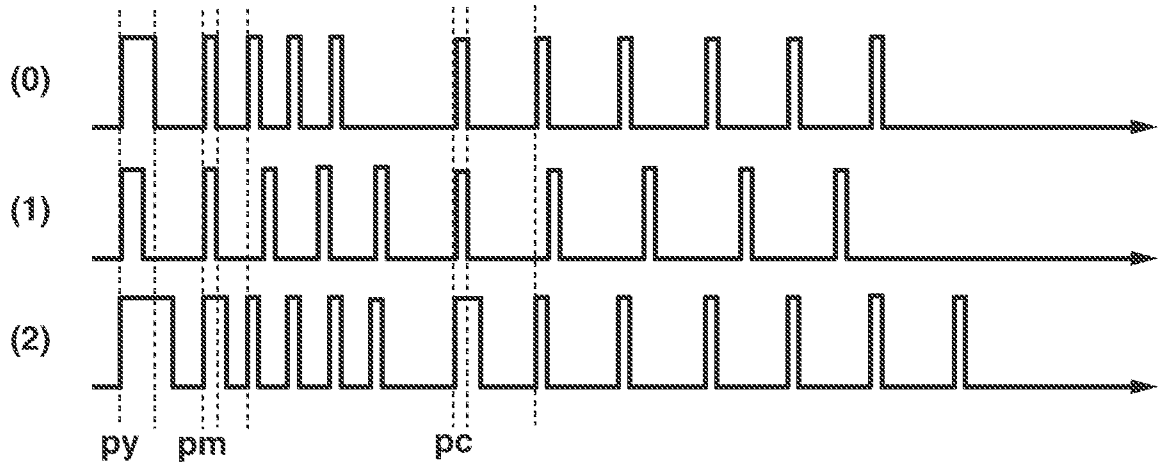
FIG. 10 illustrates pulse control according to the first embodiment.

The above-described 3D_LUT includes 256×256×256×3 data tables. For each piece of data, the timing, the width, and the number of heating pulses to be applied at each timing are set based on a combination of the RGB values, as illustrated in FIG. 7. As the high-density pulse, the CPU 401 sets a pulse with the focus on color development of a solid image of each color. FIG. 10 illustrates a high-density pulse, a low-density pulse, and a high-density pulse for black. In step S913, the CPU 401 sets the high-density pulse (0) in FIG. 10. The low-density pulse will be described below in step S915, and the high-density pulse will be described below in step S916. The density of solid black can be increased if the high-density pulse for black is set such that the color of the bottom image forming layer 18 of the immediately subsequent pixel is developed, when applied to the target pixel. As described above, it takes time until the temperature of the bottom image forming layer 18 rises. Thus, color development of the immediately subsequent pixel caused by the heat propagation from the target pixel is effective to increase the density when causing the immediate pixel to develop black. The high-density pulse for black is set to have a larger duty ratio (a larger pulse width or narrower pulse intervals) or a larger number of pulses than the low-density pulse described in step S614. In other words, the high-density pulse for black is set to have a high thermal energy than the low-density pulse. The high-density pulse does not need to have a higher thermal energy than the low-density pulse for all of the RGB values. Color development of the immediately subsequent pixel caused by the heat applied to the target pixel varies depending on a combination of the recording head 30, the recording medium 10, and the recording speed. Based on the above-described combination, the high-density pulse is set to have a higher thermal energy than the low-density pulse with respect to the RGB values that achieve a higher density by developing the color of the immediately subsequent pixel. Depending on the color to be developed, the immediately subsequent pixel does not develop color even by increasing the thermal energy of the target pixel. For the RGB values corresponding to such a color, the high-density pulse needs not be set to have a higher thermal energy than the low-density pulse.

In step S914, the CPU 401 determines whether the target pixel is a black trailing edge pixel. In a case where the CPU 401 determines the three preceding pixels to match any one of the patterns (a) to (d) in FIG. 8 in step S907, and determines that the bottom layer of the immediately subsequent pixel is not to be subjected to color development in step S908 (YES in step S914), the processing proceeds to step S915. On the other hand, in a case where the CPU 401 determines the three preceding pixels to match any one of the patterns (e) to (h) in FIG. 8, and determines that the bottom layer of the immediately subsequent pixel is not subjected to color development (NO in step S914), the processing proceeds to step S916.

In step S915, the CPU 401 sets the low-density pulse to the target pixel marked with a single circle in the patterns (a) to (h) in FIG. 8. The low-density pulse can be set using a three-dimensional look-up table (3D_LUT) as follows:

$$\text{Low-density pulse}=\text{3D\_LUT}[R][G][B][1].$$

As the low-density pulse, the CPU 401 sets a pulse that develops the color of the pixel at the trailing edge of a solid image of each color but does not cause false color development of the immediately subsequent pixel due to the heat applied to the pixel at the trailing edge. In this step S915, the CPU 401 sets the low-density pulse (1) in FIG. 10 to a black pixel. The pulse width of the low-density pulse is made smaller than that of the high-density pulse, like the pulses at the timing py in FIG. 10. Alternatively, the pulse interval of the low-density pulse is set greater than that of the high-density pulse, like the pulses at the timing pm and subsequent timings. Alternatively, the number of pulses of the low-density pulse is set smaller than that of the high-density pulse, like the pulses at the timing pc and subsequent timings. The pulse (1) in FIG. 10 reflects all of the smaller pulse width, the greater pulse interval, and the smaller number of pulses. However, the same effect can be obtained by using a pulse that reflects at least one of the conditions. For this reason, the thermal energy applied to the recording medium 10 by the low-density pulse is made lower than that applied by the high-density pulse. Color development of the bottom layer of the immediately subsequent pixel which is not to be subjected to color development can be prevented if the low-density pulse for black is set such that the color of the bottom image forming layer 18 of the immediately subsequent pixel is not developed, when applied to the target pixel.

In step S916, the CPU 401 sets a leading edge pulse to the target pixel marked with a single circle in FIG. 8. The leading edge pulse can be set using a three-dimensional look-up table (3D_LUT) as follows:

Leading edge pulse=3D_LUT[*R*][*G*][*B*][2].

In step S916, the CPU 401 sets the leading edge pulse (2) in FIG. 10 to a black pixel. The pulse width of the leading edge pulse is made larger than that of the high-density pulse, like the pulses at the timings py, pm, or pc in FIG. 10. The number of pulses of the leading edge pulse is larger than that of the high-density pulse at the timing pm or pc and subsequent timings. It is desirable that the thermal energy applied to the recording medium 10 by the leading edge pulse is made higher than that applied by the high-density pulse. The target pixel in step S916 is likely to be the leading edge of the image, and hence the heat propagation from the preceding pixels is small. Therefore, by applying the leading edge pulse with a higher thermal energy than the high density pulse, favorable color development can be obtained at the leading edge of the image.

In step S917, the CPU 401 performs control of the recording head 30 (head control). The CPU 401 applies the pulse set in step S913, S915, or S916 to the recording head 30 to develop the color of the recording medium 10.

In step S918, the CPU 401 checks whether recording on the corresponding page is completed. In a case where recording is not completed (NO in step S918), the processing returns to step S903. In step S903, the CPU 401 continues the recording of the corresponding page by setting the next pixel as the target pixel (the pixel in the row n+1). In a case where recording is completed (YES in step S918), the processing proceeds to step S919. In step S919, the print processing is ended.

Figure 11:
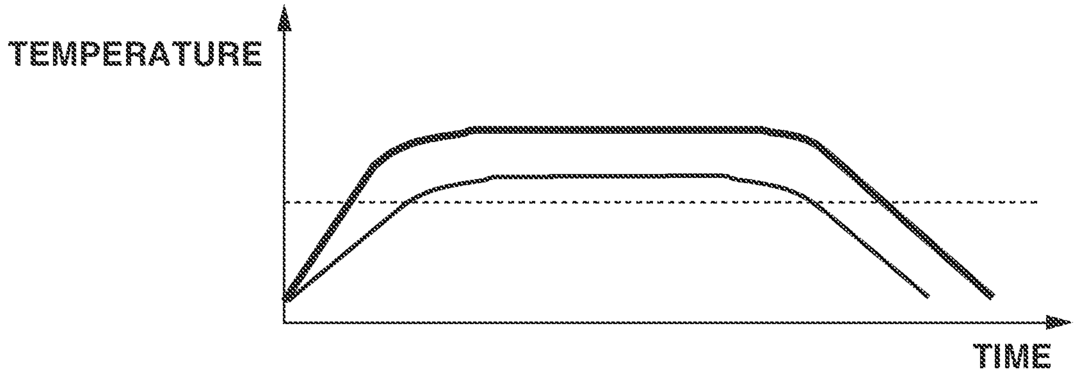
FIG. 11 illustrates a temperature of a bottom image forming layer in relation to time according to the first embodiment.

In the above-described method, in a case where the thermal history is equal to or larger than the predetermined value and the bottom layer of the immediately subsequent pixel is to be subjected to color development, a pulse with a higher thermal energy is applied to the target pixel of black as compared to a case where the bottom layer of the immediately subsequent pixel is not to be subjected to color development even with the same thermal history. As illustrated in FIG. 10, the thermal energy can be increased by increasing the pulse width or reducing the pulse interval, i.e., by increasing the duty ratio of the pulse. The thermal energy can also be increased by increasing the number of pulses. FIG. 11 is a graph illustrating a relation between the temperature of the image forming layer 18 and time when the pulses (0) and (1) in FIG. 10 are applied for one pixel. The thick line indicates the result of the high-density pulse (0) in FIG. 10, and the thin line the result of the low-density pulse (1) in FIG. 10. The dotted line indicates the color developing temperature of the image forming layer 18. The image forming layer 18 develops color when its temperature reaches or exceeds the color developing temperature. The high-density pulse provides a larger region where the color developing temperature is reached or exceeded than the low-density pulse does. This is because at least either one of a temperature region where the temperature reaches or exceeds the color developing temperature and a time region where the temperature reaches or exceeds the color developing temperature can be larger by the high-density pulse than the low-density pulse. As a result, recording the trailing edge of a high-density image using the low-density pulse prevents color development of the white pixel immediately after the trailing edge of a solid image, and enables image recording while reducing the density in a region inside a solid image by the high-density pulse.

Although, in the processing in FIG. 9, the RGB values are used for the determination of color development of a pixel, the processing is not limited thereto. For example, the CPU 401 may determine the degree of color development for each pixel based on the CMY values converted from the RGB values.

A method for finely controlling the heating pulses in accordance with the thermal history will be described below. A high temperature of the recording head 30 or the recording medium 10 may cause damage to the recording head 30 or the recording medium 10 depending on the relation between the recording head 30, the recording medium 10, and the heating pulse. To prevent damage to the recording head 30 or the recording medium 10, the heating pulses can be controlled in accordance with the thermal history.

Figure 12:
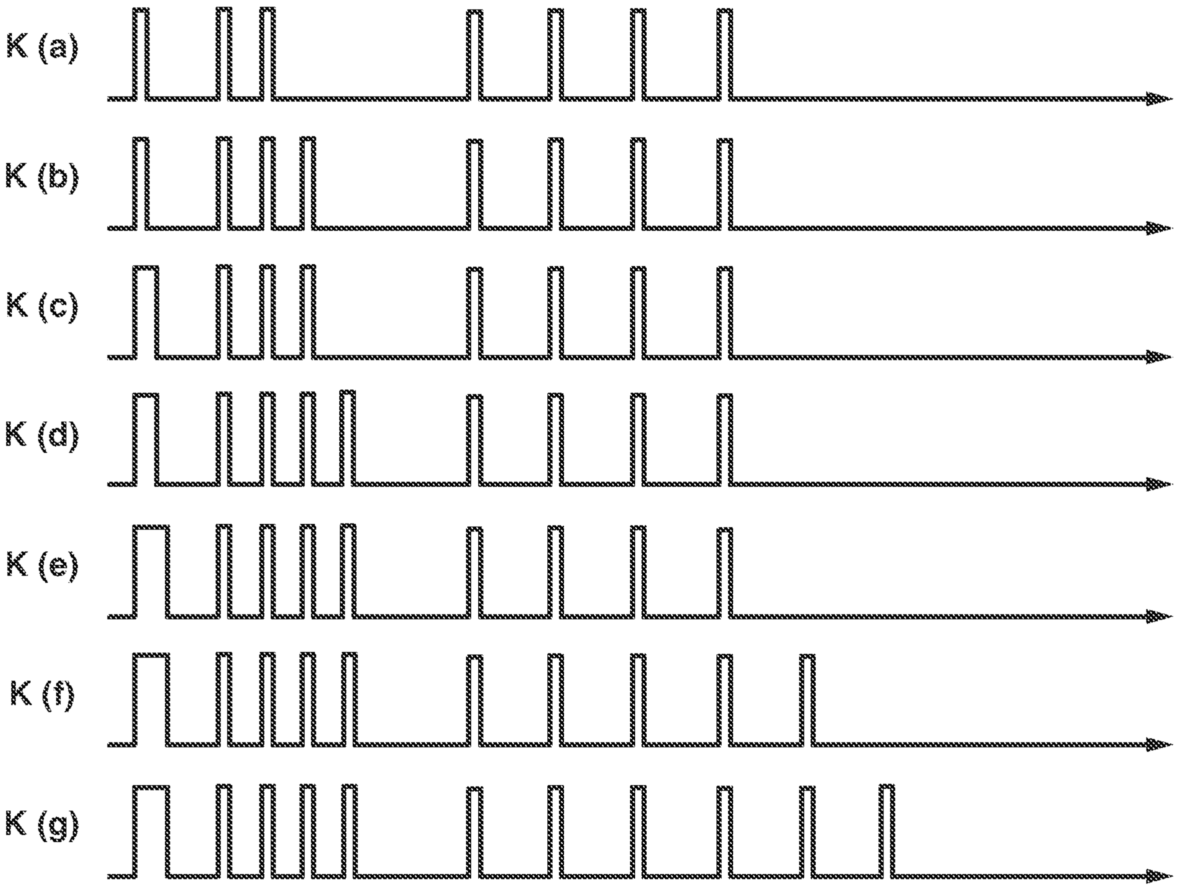
FIG. 12 illustrates high-density pulse control using a thermal history according to the first embodiment.

FIG. 12 illustrates an example of finely controlling the high-density pulses in accordance with the thermal history. The CPU 401 performs this control in step S913. The following description will be given based on a case where the three preceding pixels are determined to match any one of the patterns (a) to (g) in FIG. 8 in step S907 or S910, and the bottom layer is determined to be subjected to color development in step S908 or S911. In step S912, the CPU 401 makes the foregoing determination, and determines the target pixel marked with a single circle in FIG. 8 to be a black internal pixel.

In step S913, the CPU 401 sets the heating pulses (a) to (g) in FIG. 12 corresponding to the patterns (a) to (g) in FIG. 8, respectively, by using the 3D_LUT as follows.

High-density pulse (*a*)=3DLUT[*R*][*G*][*B*][0][0]

High-density pulse (*b*)=3DLUT[*R*][*G*][*B*][0][1]

High-density pulse (*c*)=3DLUT[*R*][*G*][*B*][0][2]

High-density pulse (*d*)=3DLUT[*R*][*G*][*B*][0][3]

High-density pulse (*e*)=3DLUT[*R*][*G*][*B*][0][4]

High-density pulse $(f)$=3DLUT[$R$][$G$][$B$][0][5]

High-density pulse $(g)$=3DLUT[$R$][$G$][$B$][0][6]

The above-described 3D_LUT includes 256×256×256×3×7 data tables. The heating pulse (g) in FIG. 12 is the same as the high-density pulse (0) in FIG. 10. When a higher temperature is estimated from the thermal history, heating pulses with a lower thermal energy than the pulse (g) in FIG. 12 are set, like the pulses (a) to (f) in FIG. 12. The thermal energies of the high-density pulses (a) to (g) in FIG. 12 are set higher than those of the low-density pulses (a) to (g) in FIG. 13.

Figure 13:
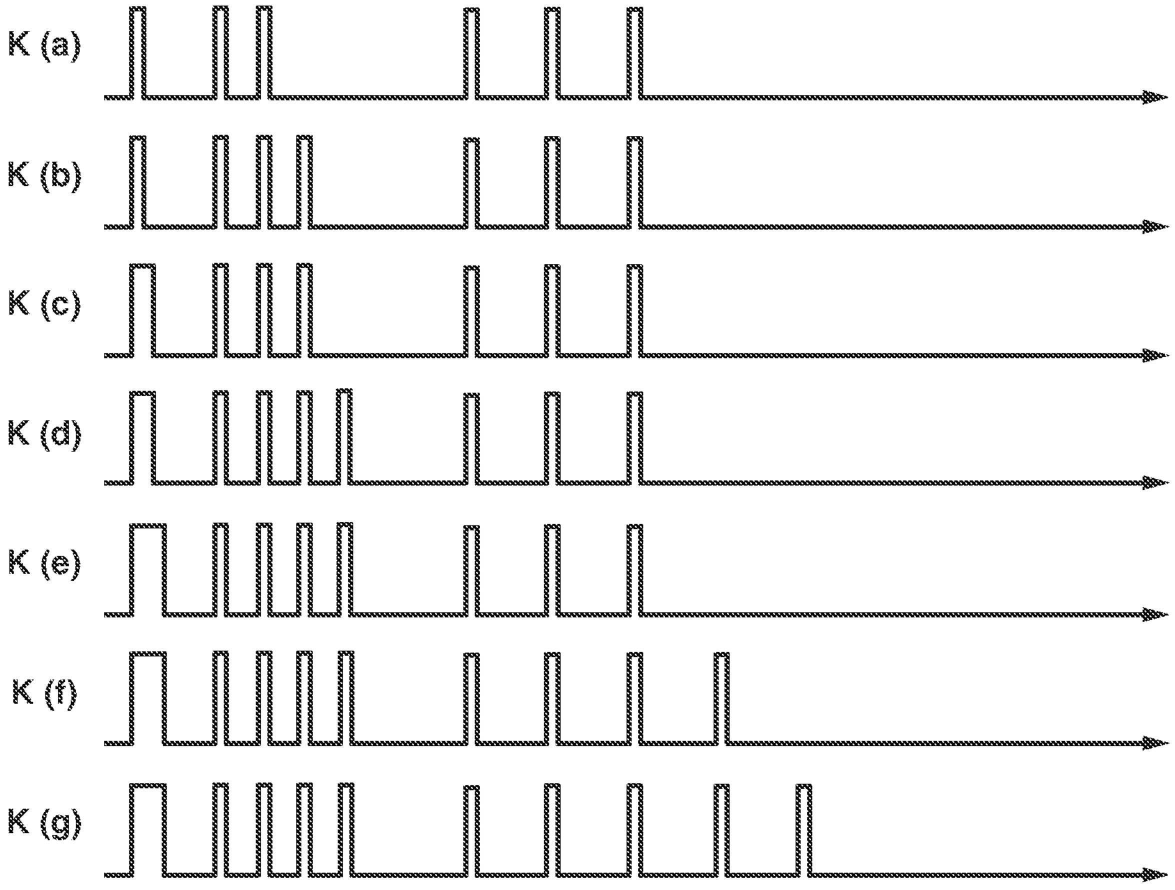
FIG. 13 illustrates low-density pulse control using the thermal history according to the first embodiment.

FIG. 13 illustrates an example of finely controlling the low-density pulses in accordance with the thermal history. The CPU 401 performs this control in step S915. The following description will be given based on a case where the three preceding pixels are determined to match any one of the patterns (a) to (g) in FIG. 8 in step S907 or S910, and the bottom layer is determined not to be subjected to color development in step S908 or S911. In S913, the CPU 401 makes the foregoing determination, and determines the target pixel marked with a single circle in FIG. 8 to be a black trailing edge pixel. In S915, the heating pulses (a) to (g) in FIG. 13 corresponding to the patterns (a) to (g) in FIG. 8, respectively, are set as follows.

Low-density pulse $(a)$=3DLUT[$R$][$G$][$B$][1][0]

Low-density pulse $(b)$=3DLUT[$R$][$G$][$B$][1][1]

Low-density pulse $(c)$=3DLUT[$R$][$G$][$B$][1][2]

Low-density pulse $(d)$=3DLUT[$R$][$G$][$B$][1][3]

Low-density pulse $(e)$=3DLUT[$R$][$G$][$B$][1][4]

Low-density pulse $(f)$=3DLUT[$R$][$G$][$B$][1][5]

Low-density pulse $(g)$=3DLUT[$R$][$G$][$B$][1][6]

When a higher temperature is estimated from the thermal history, heating pulses with a lower thermal energy than the pulse (g) in FIG. 13, like the pulses (a) to (f) in FIG. 13, are set. The thermal energies of the low-density pulses (a) to (g) in FIG. 13 are set higher than those of the high-density pulses (a) to (g) in FIG. 12.

Also in a case of finely controlling pulses based on the thermal history, in step S916, the leading edge pulse can be set by storing pulse data of the pulse (2) in FIG. 10 in 3DLUT[R][G][B][2][0].

Leading edge pulse=3DLUT[$R$][$G$][$B$][2][0]

Since 3DLUT[R][G][B][2][1] to 3DLUT[R][G][B][2][6] are not referenced in this case, any data can be stored.

The method described above with reference to FIGS. 12 and 13 implements image recording that can prevent color development of the white pixel immediately after the trailing edge of a solid image and reduction in the density of the solid image while preventing damage to the recording head 30 or the recording medium 10.

The first embodiment has been described above centering on an example where the high-density pulse is set to provide at least either one of a larger duty ratio and the larger number of heating pulse to be applied. A second present embodiment will be described below centering on an example where the high-density pulse is set such that a blank time before the immediately subsequent pixel becomes short in the recording time (pulse value range) of the target pixel.

Figure 14:
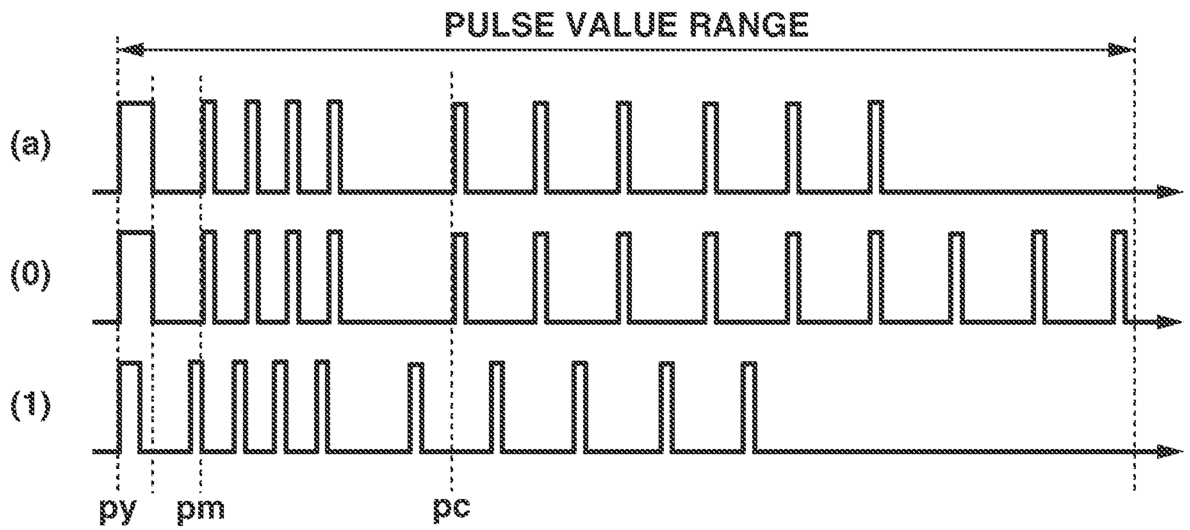
FIG. 14 illustrates pulse control according to a second embodiment.

FIG. 14 illustrates pulses with variation in the blank time (described below) in the pulse value range. The pulse (a) in FIG. 14 is the same as the high-density pulse (0) in FIG. 10. The high-density pulse according to the present embodiment is the pulse (0) in FIG. 14. The low-density pulse according to the present embodiment is the pulse (1) in FIG. 14.

The pulse width, the pulse interval, and the number of pulses can be set arbitrarily within the pulse value range illustrated in FIG. 14. The pulses set in the pulse value range are applied to one pixel. The high-density pulse (0) in FIG. 14 has a shorter blank time during which no pulse is applied in the pulse value range than the pulse (a) in FIG. 14. In the blank time, the temperatures of the recording head 30 and the recording medium 10 drop. Accordingly, the pulse (0) in FIG. 14 with a short blank time can suppress the temperature drop in one pixel to be small, and thus the temperature of the image forming layer 18 that reaches or exceeds the color developing temperature can be set high, and the time duration during which the color developing temperature is reached or exceeded can be set long. On the other hand, the low-density pulse (1) in FIG. 14 has a longer blank time than the high-density pulse (0) in FIG. 14. Accordingly, in the case of the low-density pulse (1) in FIG. 14, the temperature of the image forming layer 18 that reaches or exceeds the color developing temperature is low, and the time duration during which the color developing temperature is reached or exceeded is short, compared to the case of the high-density pulse (0) in FIG. 14. A flowchart for controlling a thermal pulse to perform printing is similar to the flowchart described above with reference to FIG. 9 according to the first embodiment. Differences between the two flowcharts are described below.

In step S913, the CPU 401 sets the pulse data (0) in FIG. 14 instead of the pulse (0) in FIG. 10 (the pulse (a) in FIG. 14) in the 3DLUT as follows:

High-density pulse=3DLUT[$R$][$G$][$B$][0].

This enable the high-density pulse (0) in FIG. 14 to be set to black of the target pixel determined to be a black internal pixel in step S912.

Further, in step S915, the CPU 401 sets the pulse data (1) in FIG. 14 instead of the pulse (1) in FIG. 10 in the 3DLUT as follows:

Low-density pulse=3DLUT[$R$][$G$][$B$][1].

This enable the low-density pulse (1) in FIG. 14 to be set to black of the target pixel determined to be a black trailing edge pixel in step S914.

In the above-described method, in a case where the thermal history is equal to or larger than the predetermined value and the bottom layer of the immediately sequent pixel is to be subjected to color development, a pulse with a high thermal energy is applied to the black target pixel as compared to a case where the bottom layer is not to be subjected to color development even with the same thermal history. As a result, it becomes possible to implement image recording that can prevent color development of the white pixel immediately after the trailing edge of a solid image by the low-density pulse and reduction in the density of a region in the solid image by the high-density pulse.

The first and the second embodiments have been described above centering on a low-density pulse in a case of applying a pulse for color development of yellow (Y), a pulse for color development of magenta (M), and a pulse for color development of cyan (C) in this order in the pulse value range. A third embodiment will be described below centering on an example of a low-density pulse where a pulse for color development of cyan (C) is applied first.

Figure 15:
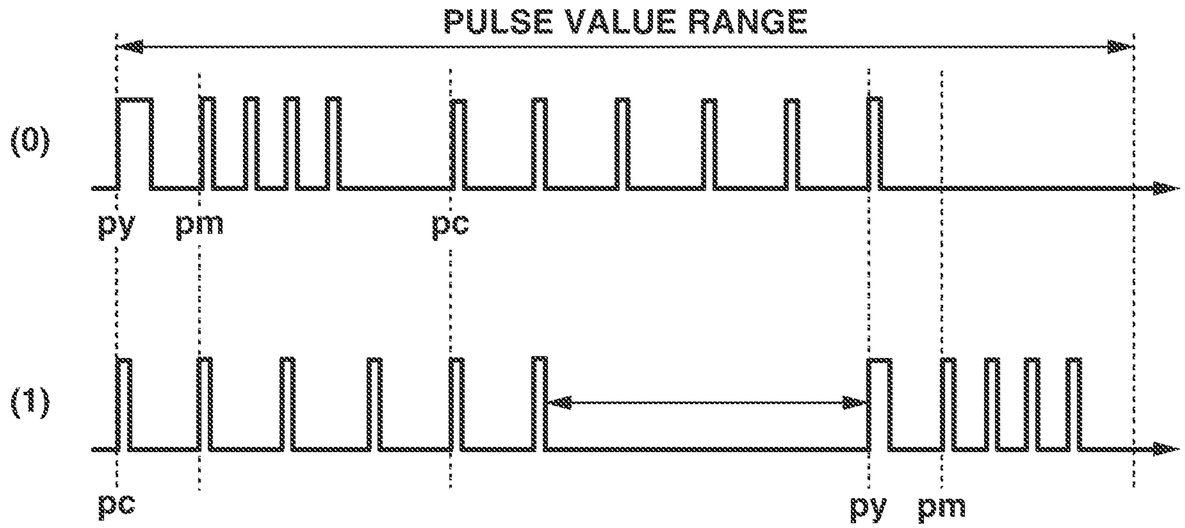
FIG. 15 illustrates pulse control according to a third embodiment.

FIG. 15 illustrates an example where the order of pulses in the pulse value range is changed. The high-density pulse according to the present embodiment is illustrated as the pulse (0) in FIG. 15 and is the same as the pulse (0) in FIG. 10. The low-density pulse according to the present embodiment is illustrated as the pulse (1) in FIG. 15. The pulse width, the pulse interval, and the number of pulses within the pulse value range illustrated in FIG. 15 can be set arbitrarily. The pulses set in the pulse value range are applied to one pixel. The reason why the pulse (0) in FIG. 15 is a high-density pulse is as described above with reference to FIG. 10 according to the first embodiment. The reason why the pulse (1) in FIG. 15 is a low-density pulse will be described below.

The high-density pulse (0) in FIG. 15 includes a yellow (Y) color development pulse, a magenta (M) color development pulse, and a cyan (C) color development pulse in this order. On the other hand, the low-density pulse (1) in FIG. 15 includes a cyan (C) color development pulse, a yellow (Y) color development pulse, and a magenta (M) color development pulse in this order. When pulses are applied to the target pixel in the order illustrated as the pulse (0) in FIG. 15, the bottom image forming layer 18 of the immediately subsequent pixel develops color, cyan (C) in this case, as described above. Referring to the pulse (1) in FIG. 15, the application order of the cyan (C) color development pulse is changed to the timing pc, and the cyan (C) color development pulse is applied at the timing pc in order to develop cyan (C) preferentially by using the heat applied to the target pixel. Then, a long blank time indicated by the arrow is provided between the last cyan (C) color development pulse and the timing py when the yellow (Y) color development pulse is applied, as illustrated in the pulse (1) in FIG. 15. The blank time is set to a time duration longer than the time duration during which the temperature of the image forming layer 18 to be subjected to cyan (C) color development is lowered below the color developing temperature. After lowering the temperature of the image forming layer 18 to a temperature at which cyan (C) is not developed, the yellow (Y) and magenta (M) color development pulses are applied at the timings py and pm, respectively, to cause the target pixel to develop black. The yellow (Y) and magenta (M) color development pulses are set such that the temperatures of the image forming layer 14 for color development of yellow (Y) and the image forming layer 16 for color development of magenta (M) are raised to temperatures higher than the respective color developing temperatures, and the temperature of the image forming layer 18 for color development of cyan (C) is lowered below the color developing temperature. Like the red (R) color development pulse in FIG. 7, cyan (C) can be prevented from being developed by applying the yellow (Y) development pulse and the magenta (M) color development pulse in a relatively short time. The temperatures of the image forming layers 14 and 16 can be lowered more quickly than the temperature of the image forming layer 18 by stopping the pulse application. In such a manner, the target pixel can be caused to develop black while preventing the image forming layer 18 of the immediately subsequent pixel from developing color.

A flowchart for controlling the thermal pulse to perform printing is similar to the flowchart described above with reference to FIG. 9 according to the first embodiment. Differences between the two flowcharts are described below.

In step S915, the CPU 401 sets the pulse data (1) in FIG. 15 instead of the pulse (1) in FIG. 10 in the 3DLUT as follows:

$$\text{Low-density pulse}=\text{3DLUT}[R][G][B][1].$$

This enable the low-density pulse (1) in FIG. 15 to be set to black of the target pixel determined to be a black trailing edge pixel in step S914.

In the above-described method, in a case where the thermal history is equal to or larger than the predetermined value and the bottom layer of the immediately subsequent pixel is to be subjected to color development, a pulse with a high thermal energy is applied to the black target pixel as compared to a case where the bottom layer is not to be subjected to color development even with the same thermal history. As a result, it becomes possible to implement image recording that can prevent color development of the white pixel immediately after the trailing edge of a solid image by the low-density pulse and reduction in the density of a region in the solid image by the high-density pulse.

The first to the third embodiments have been described above centering on an example where the thermal energy in an internal region of a black image is set higher than that at the trailing edge of the black image. A fourth present embodiment will be described below centering on an example where the thermal energy in an internal region of an image is set higher than those at the right and left edges of the image.

In the above-described first embodiment, there has been described a case where the temperature of the image forming layer 18 of the immediately subsequent pixel reaches and exceeds the color developing temperature due to the heat propagation of the heating pulse of the target pixel, possibly causing the immediately subsequent pixel to develop color. The heat of the heating pulse of the immediately subsequent pixel propagates not only to a subsequent pixel of a target pixel in a posterior direction but also to a pixel to the right or left of the target pixel if the temperature of the right or left pixel is lower than that of the target pixel. Thus, the high-density pulse on the pixels at the right and left edges of a solid black image may cause the image forming layer 18 of an adjacent white pixel to develop cyan (C).

Figure 16:
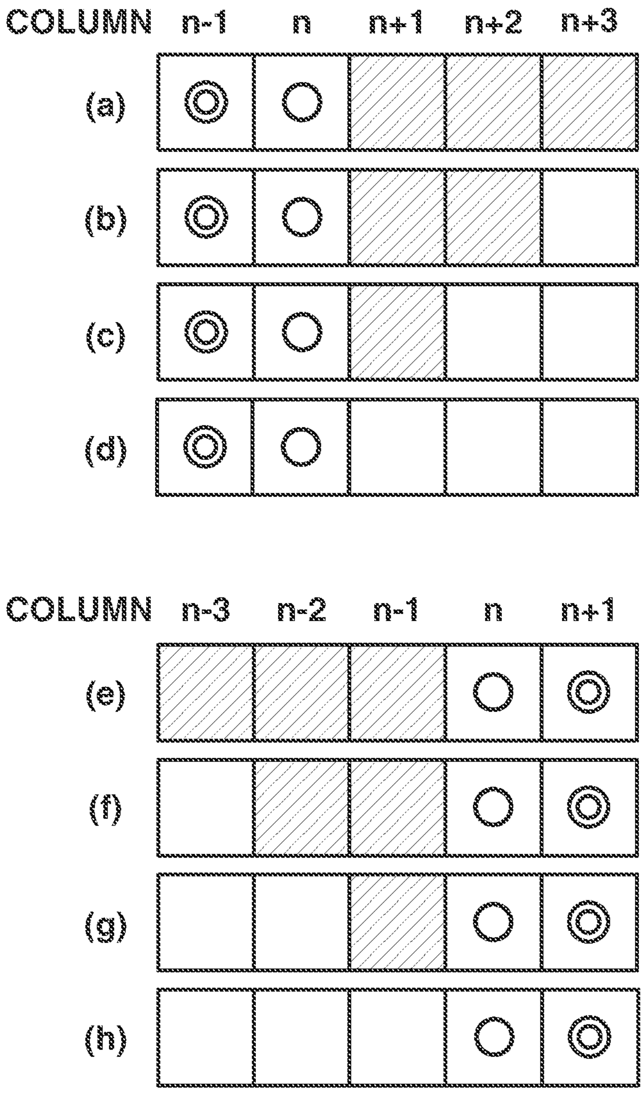
FIG. 16 illustrates reference pixels and image patterns according to a fourth embodiment.

FIG. 16 illustrates pixels to be referenced to control the heating pulses according to the present embodiment. The patterns (a) to (d) in FIG. 16 illustrate a target pixel marked with a single circle, three pixels adjacent to the right of the target pixel, and one pixel marked with a double circle adjacent to the left of the target pixel. The shaded pixels of the three pixels adjacent to the right of the target pixel indicate pixels that has developed black, i.e., black color development patterns of the three pixels. The following descriptions will be given centering on a case where the target pixel is to be subjected to black color development, and the pixel marked with a double circle adjacent to the left of the target pixel is not to develop the color of the image forming layer 18, and a case where the same pulse is applied to all of pixels to be subjected to black color development. In the pattern (a) in FIG. 16, since all of the three adjacent pixels are subjected to color development, the temperatures of the recording head 30 and the recording medium 10 at the target pixel are the highest among the patterns (a) to (d) in FIG. 16. In the pattern (d) in FIG. 16, since none of the three adjacent pixels are subjected to color development, the temperatures of the recording head 30 and the recording medium 10 at the target pixel are the lowest among the patterns (a) to (d) in FIG. 16. Thus, the temperatures of the recording head 30 and the recording medium 10 at the target pixel are higher in order of the patterns (a) to (d) in FIG. 16. The patterns (e) to (h) in FIG. 16 indicate laterally inverted patterns of the patterns (a) to (d) in FIG. 16, respectively. The temperatures of the recording head 30 and the recording medium 10 at the target pixel are higher in order of the patterns (e) to (h) in FIG. 16. The higher the temperatures of the recording head 30 and the recording medium 10 as in the pattern (a) or (e) in FIG. 16, the more the image forming layer 18 of the pixel in the column n−1 or the column n+1 is likely to develop color.

The description has been given of the temperatures of the recording head 30 and the recording medium 10 at the target pixel in a case where the same pulse is applied to all of the pixels to be subjected to black color development regardless of the patterns (a) to (h) in FIG. 16. Pulse control in view of the above description will be described below with reference to FIG. 17.

Figure 17:
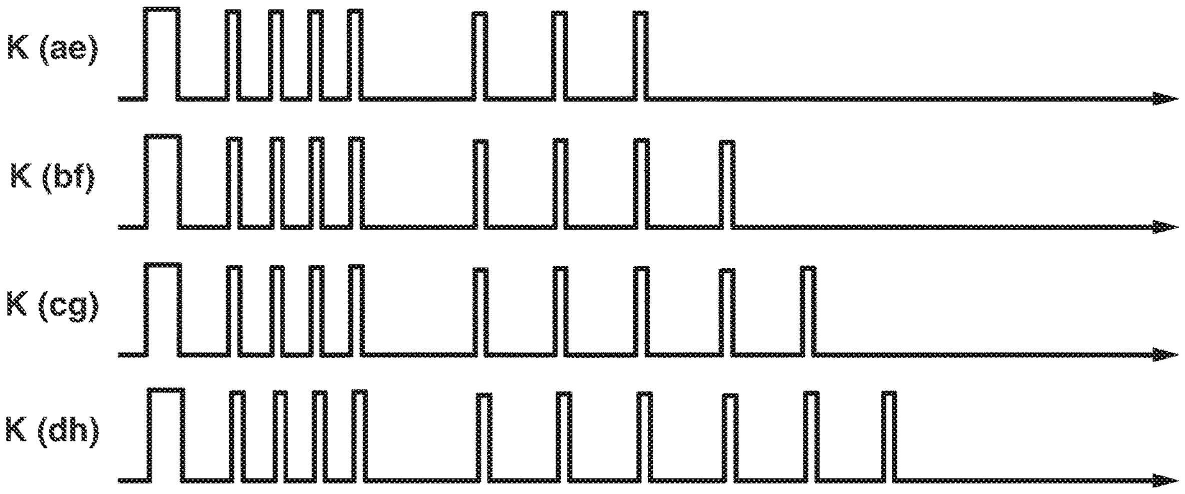
FIG. 17 illustrates pulse control according to the fourth embodiment.

The pulses (ae) to (dh) in FIG. 17 illustrate heating pulses corresponding to the patterns (a) to (d) and the patterns (e) to (h) in FIG. 16, respectively. In FIG. 17, the heating pulse (dh) is a high-density pulse with the highest thermal energy, and the heating pulse (ae) is a low-density pulse with the lowest thermal energy. The thermal energy is higher in order of pulses (dh), (cg), (bf), and (ae). If the pixels in three consecutive columns immediately before or after the target pixel are to be subjected to black color development, like the pattern (a) or (e) in FIG. 16, the heating pulse (ae) in FIG. 17 is applied to black of the target pixel. If the pixels in two consecutive columns immediately before or after the target pixel are to be subjected to black color development, like the pattern (b) or (f) in FIG. 16, the heating pulse (bf) in FIG. 17 is applied to black of the target pixel. If the pixel in the column immediately before or after the target pixel is to be subjected to black color development, like the pattern (c) or (g) in FIG. 16, the heating pulse (cg) in FIG. 17 is applied to black of the target pixel. Even in a case where the pixel in the column n+3 or the column n−3 respectively in the pattern (c) or (g) in FIG. 16 is to be subjected to black color development, the heating pulse (cg) in FIG. 17 is applied. If the pixel in the column n+1 or the column n−1 immediately before or after the target pixel is not to be black color development, like the pattern (d) or (h) in FIG. 16, the heating pulse (dh) is applied to black of the target pixel. For patterns other than the above-described ones, for example, when the target pixel marked with a single circle in FIG. 16 is black, and the pixel marked with a double circle in FIG. 16 is to be subjected to color development of the image forming layer 18, the target pixel is determined to be an internal pixel inside a solid black image. Thus, the heating pulse (dh) that provides the highest thermal energy is applied.

The above-described method make it possible to implement image recording that can prevent the white adjacent pixels on the right and left edges of a black solid image from developing color by the low-density pulse while preventing the density in an internal region of the black sold image from being lowered by the high-density pulse.

Other Exemplary Embodiments

The first to the third embodiments have been described above centering on a case of applying pulses with a higher energy to an internal region of a solid black image than pulses applied to a trailing edge of the solid black image. This is synonymous with a case of applying pulses with a lower thermal energy to the trailing edge of the solid black image than pulses applied to the internal region of the solid black image. The CPU 401 may execute steps S914 and S915 prior to steps S912 and S913 in FIG. 9. The immediately subsequent pixel is determined to be a black trailing edge pixel where the color of the image forming layer 18 is not to be developed, and the low-density pulse is applied. In a case where the immediately subsequent pixel is determined to be not a black trailing edge pixel, it is determined whether the immediately subsequent pixel is a black internal pixel, and the high-density pulse is applied.

Although the first embodiment has been described above centering on black pixel data with all of the values r0 to r2, g0 to g2 and b0 to b2 to zero, these values may be set to other values than zero. However, it is desirable to estimate that a temperature immediately before a target pixel is high due to a thermal history, determine whether the image forming layer 18 of a pixel immediately after the target pixel is subjected to color development, and set the numerical values to values for colors of which the image density can be increased by applying a high-density pulse.

The fourth embodiment has been described above centering on a case where a low-density pulse is set to the right and left edges of a solid black image. The first and the fourth embodiments may be implemented in combination. The right and left edge pulses illustrated in FIG. 17 can be adjusted according to a temperature that can be estimated based on the thermal history. If it is estimated that the temperature of the recording head 30 or the recording medium 10 has increased due to continuous recording of black in the conveyance direction, pulses with a further lower thermal energy than the thermal energy of the pulses illustrated in FIG. 17 may be applied. Also, in the case of the right and left edges and the trailing edge, the thermal energy may be smaller than that of each pulse illustrated in FIG. 17.

The present embodiment makes it possible to prevent false color development of a pixel immediately after a pixel to be subjected to high-density image recording.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-015784, filed Feb. 3, 2022, which is hereby incorporated by reference herein in its entirety.

What is claimed is:

1. A recording apparatus comprising:

a recording head including a plurality of heating elements arranged in a predetermined direction, configured to heat, based on image data, a sheet-like recording medium formed of a plurality of laminated color-developing layers for developing a plurality of colors when heated, and develop a color of a specific color-developing layer among the plurality of color-developing layers to form an image on the recording medium;

a first condition determination unit configured to determine whether a first condition is satisfied, the first condition indicating that a subsequent pixel, located at a same position as a target pixel in the predetermined direction and to be recorded following the target pixel, is a pixel for developing a color of a bottom color-developing layer of the recording medium; and a pulse control unit configured to control a pulse to be applied to the recording head in forming the target pixel, based on the determination result of the first condition determination unit, wherein, in a case where a value of the target pixel in the image data is a predetermined value and does not satisfy the first condition, the pulse control unit controls the pulse so that a thermal energy to be applied to the recording medium by the recording head in forming the target pixel is lower than a thermal energy to be applied in a case where the value of the target pixel in the image data is the predetermined value and the first condition is satisfied.

2. The recording apparatus according to claim 1, wherein, in a case where the thermal energy to be applied to the recording medium by the recording head is to be lowered, the pulse control unit controls the pulse so that at least one of a heating temperature and a heating time of the recording head is less than a heating temperature or a heating time of the recording head in a case where the thermal energy to be applied to the recording medium by the recording head is not to be lowered.

3. The recording apparatus according to claim 1, wherein, in a case where the thermal energy to be applied to the recording medium by the recording head is to be lowered, the pulse control unit applies, to the recording head, a pulse having been subjected to at least one of reducing a pulse width, increasing an interval between pulses, and decreasing a number of times of pulse application compared to a case where the thermal energy to be applied to the recording medium by the recording head is not to be lowered.

4. The recording apparatus according to claim 1, wherein, in a case where the thermal energy to be applied to the recording medium by the recording head is to be lowered, the pulse control unit increases a time duration between a pulse to be applied to the target pixel and a pulse to be applied to the immediately subsequent pixel compared to a case where the thermal energy to be applied to the recording medium by the recording head is not to be lowered.

5. The recording apparatus according to claim 1, wherein, in a case where the first condition is satisfied, the pulse control unit performs control to apply a pulse for developing a color of a color-developing layer, different from the bottom color-developing layer, of the recording medium, and lastly apply a pulse for developing the color of the bottom color-developing layer, and wherein, in a case where the first condition is not satisfied, the pulse control unit performs control to apply the pulse for developing the color of the color-developing layer different from the bottom color-developing layer after applying the pulse for developing the color of the bottom color-developing layer of the recording medium.

6. The recording apparatus according to claim 5, wherein, in a case where the first condition is not satisfied, the pulse control unit provides a time duration between the pulse for developing the color of the bottom color-developing layer and the pulse for developing the color of the color-developing layer different from the bottom color-developing layer, such that the bottom color-developing layer of the recording medium does not reach a color developing temperature due to the pulse for developing the color of the color-developing layer different from the bottom color-developing layer.

7. The recording apparatus according to claim 1, further comprising a second condition determination unit configured to determine whether a second condition is satisfied, the second condition indicating that a thermal history as a temperature of the recording head or a temperature of each image forming layer of the recording medium is equal to or greater than a predetermined value in forming a preceding pixel located at the same position as the target pixel in the predetermined direction and to be recorded before the target pixel, wherein, in a case where the value of the target pixel in the image data is the predetermined value, the first condition is satisfied, and the second condition is not satisfied, the pulse control unit controls the pulse so that the thermal energy to be applied to the recording medium by the recording head in forming the target pixel is higher than a thermal energy to be applied in a case where the value of the target pixel is the predetermined value, the first condition is satisfied, and the second condition is satisfied.

8. The recording apparatus according to claim 7, wherein, in a case where the thermal energy to be applied to the recording medium by the recording head is to be increased, the pulse control unit controls the pulse so that at least one of the heating temperature and the heating time of the recording head is greater than a heating temperature or a heating time of the recording head in a case where the thermal energy to be applied to the recording medium by the recording head is not to be increased.

9. The recording apparatus according to claim 7, wherein, in a case where the thermal energy to be applied to the recording medium by the recording head is to be increased, the pulse control unit applies, to the recording head, a pulse having been subjected to at least one of increasing a pulse width, reducing an interval between pulses, and increasing a number of times of pulse application compared to a case where the thermal energy to be applied to the recording medium by the recording head is not to be increased.

10. The recording apparatus according to claim 7, wherein, in a case where the thermal energy to be applied to the recording medium by the recording head is to be increased, the pulse control unit decreases a time duration between a pulse to be applied to the target pixel and a pulse to be applied to the immediately subsequent pixel compared to a case where the thermal energy to be applied to the recording medium by the recording head is not to be increased.

11. The recording apparatus according to claim 7, wherein, in a case where the second condition is satisfied and a temperature indicated by the thermal history is a first temperature, the pulse control unit controls the pulse so that the thermal energy to be applied to the recording medium by the recording head is higher than the thermal energy to be applied in a case where the second condition is satisfied and the temperature indicated by the thermal history is a second temperature higher than the first temperature.

12. The recording apparatus according to claim 7, wherein the second condition determination unit determines whether the second condition is satisfied, based on the thermal history in forming a plurality of preceding pixels located at the same position as the target pixel in the predetermined direction and to be recorded before the target pixel.

13. A recording apparatus comprising:

a recording head including a plurality of heating elements arranged in a predetermined direction, configured to heat, based on image data, a sheet-like recording medium formed of a plurality of laminated color-developing layers for developing a plurality of colors when heated, and configured to develop a color of a specific color-developing layer among the plurality of color-developing layers to form an image on the recording medium, wherein, in a case where the image data is data that causes a target pixel to develop black and does not cause the immediately subsequent pixel, located at a same position as the target pixel in the predetermined direction and to be recorded following the target pixel, to develop the color of the bottom color-developing layer of the recording medium, the thermal energy to be applied by the recording head in forming the target pixel is lowered compared to a case where the image data is data that causes the target pixel to develop black and causes the immediately subsequent pixel to develop the color of the bottom color-developing layer of the recording medium.

14. The recording apparatus according to claim 13, wherein, in a case where the image data is data that causes the target pixel to develop black, causes the immediately subsequent pixel to develop the color of the bottom color-developing layer of the recording medium, and does not cause a preceding pixel, located at the same position as the target pixel in the predetermined direction and to be recorded before the target pixel, to develop black, the thermal energy to be applied by the recording head in forming the target pixel is increased compared to a case where the image data is data that causes the target pixel to develop black, causes the immediately subsequent pixel to develop the color of the bottom color-developing layer of the recording medium, and causes the preceding pixel to develop black.

15. A recording apparatus that heats a sheet-like recording medium formed of a plurality of laminated color-developing layers for developing a plurality of colors when heated, and develops a color of a specific color-developing layer among the plurality of color-developing layers to form an image on the recording medium, the recording apparatus comprising:

a recording head including a plurality of heating elements arranged in a predetermined direction, and configured to heat the recording medium based on image data;

a first condition determination unit configured to determine whether a first condition is satisfied, the first condition indicating that a thermal history as a temperature of the recording head or a temperature of each image forming layer of the recording medium is equal to or greater than a predetermined value in forming a preceding pixel located at a same position as a target pixel in the predetermined direction and to be recorded before the target pixel;

a pulse control unit configured to control a pulse to be applied to the recording head in forming the target pixel, based on a determination result of the first condition determination unit, wherein, in a case where a value of the target pixel in the image data is a predetermined value and the first condition is not satisfied, the pulse control unit controls the pulse so that a thermal energy to be applied to the recording medium by the recording head in forming the target pixel is higher than a thermal energy to be applied in a case where the value of the target pixel in the image data is the predetermined value and the first condition is satisfied.

16. A recording method comprising:

heating, based on image data, a sheet-like recording medium formed of a plurality of laminated color-developing layers for developing a plurality of colors when heated, by using a recording head including a plurality of heating elements arranged in a predetermined direction, and developing a color of a specific color-developing layer among the plurality of color-developing layers to form an image on the recording medium; and determining whether a condition is satisfied, the condition indicating that an immediately subsequent pixel, located at a same position as a target pixel in the predetermined direction and to be recorded following the target pixel, is a pixel for developing a color of a bottom color-developing layer of the recording medium; and generating a pulse to be applied to the recording head in forming the target pixel, based on a result of the determining, wherein, in a case where a value of the target pixel in the image data is a predetermined value and the condition is not satisfied, the pulse is generated so that a thermal energy to be applied to the recording medium by the recording head in forming the target pixel is lower than a thermal energy to be applied in a case where the value of the target pixel in the image data is the predetermined value and the condition is satisfied, and wherein, in the heating, the recording head is heated according to the generated pulse.

17. A recording method comprising:

heating, based on image data, a sheet-like recording medium formed of a plurality of laminated color-developing layers for developing a plurality of colors when heated, by using a recording head including a plurality of heating elements arranged in a predetermined direction, and developing a color of a specific color-developing layer among the plurality of color-developing layers to form an image on the recording medium, wherein, in the heating, in a case where the image data is data that causes a target pixel to develop black and does not cause an immediately subsequent pixel, located at a same position as the target pixel in the predetermined direction and to be recorded following the target pixel, to develop a color of a bottom color-developing layer of the recording medium, a thermal energy to be applied by the recording head in forming the target pixel is lowered compared to a case where the image data is data that causes the target pixel to develop black and causes the immediately subsequent pixel to develop the color of the bottom color-developing layer of the recording medium.

18. A recording method for heating a sheet-like recording medium formed of a plurality of laminated color-developing layers for developing a plurality of colors when heated, and developing a color of a specific color-developing layer among the plurality of color-developing layers to form an image on the recording medium, the recording method comprising:

heating, based on image data, a recording head including a plurality of heating elements arranged in a predetermined direction, determining whether a condition is satisfied, the condition indicating that a thermal history as a temperature of the recording head or a temperature of each image forming layer of the recording medium is equal to or greater than a predetermined value in forming a preceding pixel located at a same position as a target pixel in the predetermined direction and to be recorded before the target pixel; and generating a pulse to be applied to the recording head in forming the target pixel, based on a result of the determining, wherein, in a case where a value of the target pixel in the image data is a predetermined value and the condition is not satisfied, the pulse is generated so that a thermal energy to be applied to the recording medium by the recording head in forming the target pixel is higher than a thermal energy to be applied in a case where the value of the target pixel in the image data is the predetermined value and the condition is satisfied, and wherein, in the heating, the recording head is heated according to the generated pulse.

* * * * *